United States Patent
Vanheerden

(10) Patent No.: US 11,509,208 B2
(45) Date of Patent: Nov. 22, 2022

(54) ACTUATOR WITH INCREASED TORQUE-TO-WEIGHT RATIO

(71) Applicant: SONY CORPORATION, Tokyo (JP)

(72) Inventor: Kirill Vanheerden, Tokyo (JP)

(73) Assignee: SONY CORPORATION, Tokyo (JP)

(*) Notice: Subject to any disclaimer, the term of this patent is extended or adjusted under 35 U.S.C. 154(b) by 147 days.

(21) Appl. No.: 16/770,338

(22) PCT Filed: Oct. 4, 2018

(86) PCT No.: PCT/JP2018/037146
§ 371 (c)(1),
(2) Date: Jun. 5, 2020

(87) PCT Pub. No.: WO2019/123772
PCT Pub. Date: Jun. 27, 2019

(65) Prior Publication Data
US 2020/0366181 A1    Nov. 19, 2020

(30) Foreign Application Priority Data
Dec. 18, 2017  (JP) .............................. JP2017-241387

(51) Int. Cl.
*H02K 7/116* (2006.01)
*H02K 41/06* (2006.01)

(52) U.S. Cl.
CPC ............. *H02K 41/06* (2013.01); *H02K 7/116* (2013.01)

(58) Field of Classification Search
CPC ...... H02K 7/116; H02K 41/06; H02K 49/102; H02K 51/00; F16H 13/12; F16H 49/005
See application file for complete search history.

(56) References Cited

U.S. PATENT DOCUMENTS

2002/0145346 A1* 10/2002 Ito ........................... H02K 7/10
                                                                310/99
2009/0039724 A1    2/2009 Wilson et al.
(Continued)

FOREIGN PATENT DOCUMENTS

CA      2969711 A1    6/2016
CN    101022239 A     8/2007
(Continued)

OTHER PUBLICATIONS

Extended European Search Report of EP Application No. 18892840.2, dated Dec. 22, 2020, 10 pages.
(Continued)

*Primary Examiner* — Eric Johnson
(74) *Attorney, Agent, or Firm* — Chip Law Group

(57) ABSTRACT

An actuator capable of achieving high output with a smaller number of parts is proposed. An actuator including a stator that has teeth arranged on an outer peripheral surface, a rotor that rotates around a central axis of the stator while teeth arranged on an outer peripheral surface mesh with the teeth arranged on the outer peripheral surface of the stator, and a second gear that rotates while meshing with a first gear coupled to the rotor coaxially with a central axis of the rotor and is coupled to an output shaft, in which the stator has an electromagnet, the rotor has a magnet, and a magnetic pole of the electromagnet corresponding to a position of the rotor moves along a circumferential direction of the stator.

19 Claims, 17 Drawing Sheets

(56) References Cited

U.S. PATENT DOCUMENTS

| | | | |
|---|---|---|---|
| 2009/0058214 A1* | 3/2009 | Mizushima | H02K 41/06 |
| | | | 310/83 |
| 2011/0012453 A1 | 1/2011 | Wilson et al. | |
| 2011/0012454 A1 | 1/2011 | Wilson et al. | |
| 2012/0074820 A1* | 3/2012 | Takeuchi | H02K 29/08 |
| | | | 310/75 R |
| 2013/0229081 A1 | 9/2013 | Huang | |
| 2016/0153522 A1 | 6/2016 | Groves et al. | |
| 2018/0036770 A1 | 2/2018 | Steijner et al. | |

FOREIGN PATENT DOCUMENTS

| | | | |
|---|---|---|---|
| CN | 102763312 A | 10/2012 | |
| CN | 102916523 A | 2/2013 | |
| CN | 103890909 A | 6/2014 | |
| JP | 2006-217779 A | 8/2006 | |
| JP | 2009-177982 A | 8/2009 | |
| JP | 2014-100027 A | 5/2014 | |
| JP | 2018-500867 A | 1/2018 | |
| WO | WO-2014125039 A2 * | 8/2014 | H02K 41/06 |
| WO | WO-2014169308 A2 * | 10/2014 | H02K 16/02 |
| WO | 2015/100630 A1 | 7/2015 | |
| WO | 2016/089855 A1 | 6/2016 | |
| WO | 2017/109818 A1 | 6/2017 | |

OTHER PUBLICATIONS

International Search Report and Written Opinion of PCT Application No. PCT/JP2018/037146, dated Dec. 25, 2018, 10 pages of ISRWO.

* cited by examiner

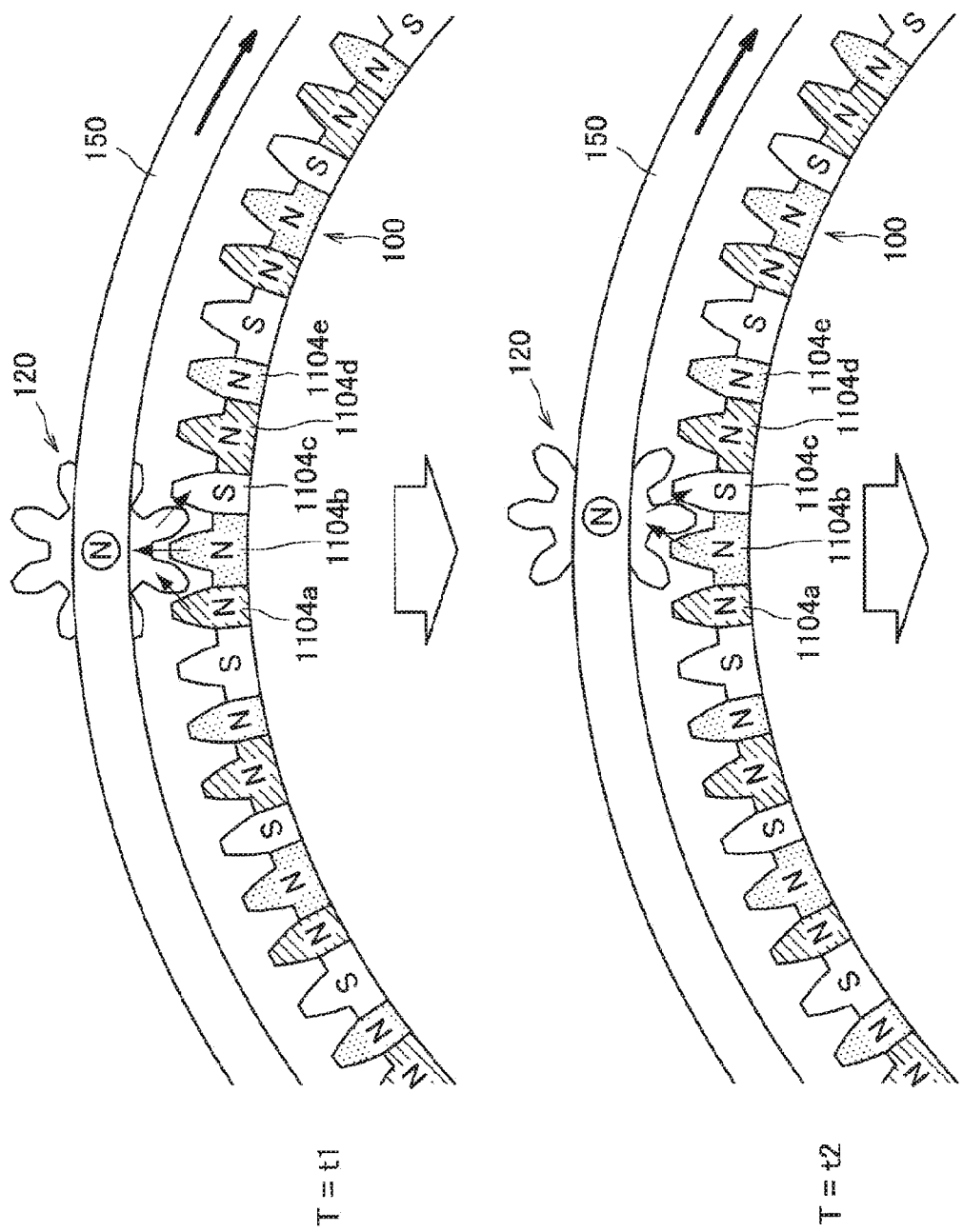

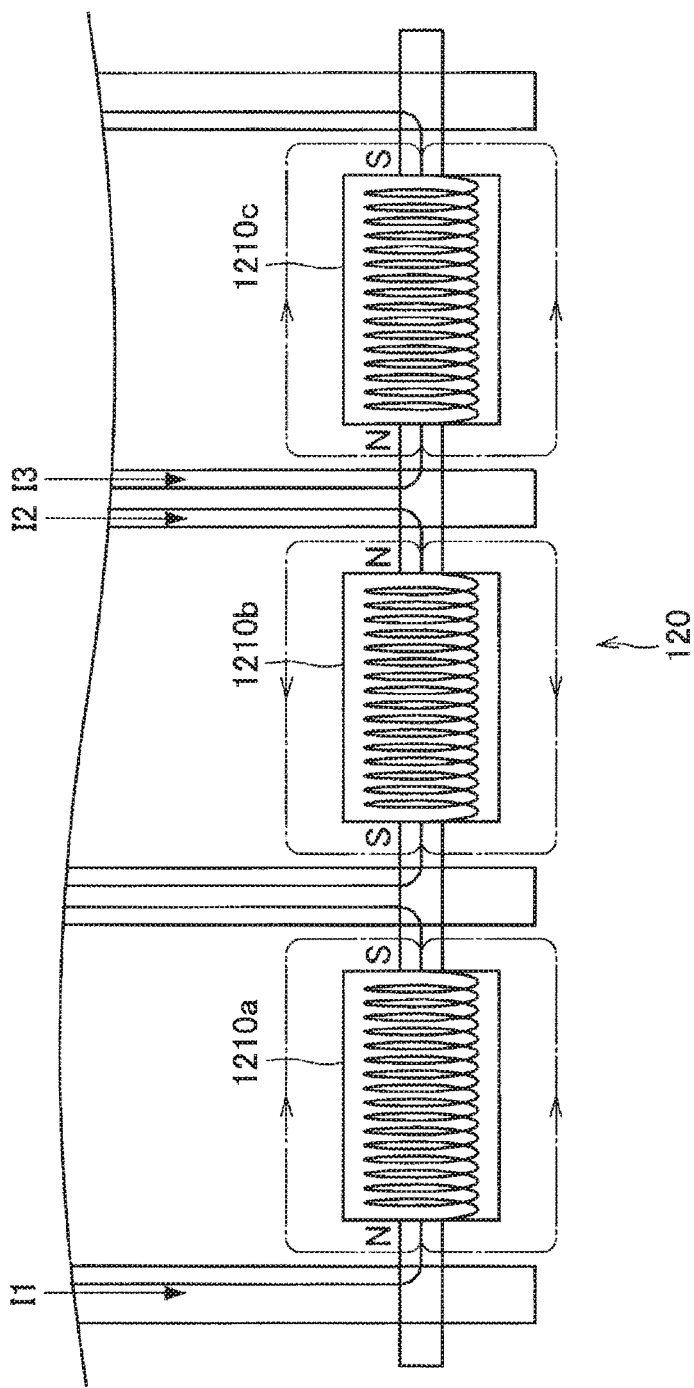

ACTUATOR WITH INCREASED TORQUE-TO-WEIGHT RATIO

CROSS REFERENCE TO RELATED APPLICATIONS

This application is a U.S. National Phase of International Patent Application No. PCT/JP2018/037146 filed on Oct. 4, 2018, which claims priority benefit of Japanese Patent Application No. JP 2017-241387 filed in the Japan Patent Office on Dec. 18, 2017. Each of the above-referenced applications is hereby incorporated herein by reference in its entirety.

TECHNICAL FIELD

The present disclosure relates to an actuator.

BACKGROUND ART

Conventionally, actuators have been used in various devices. For example, there has been known a robot arm including a force control type actuator in a joint, in which a plurality of arms is connected with the joint interposed therebetween.

For example, Patent Literature 1 below describes a rotary actuator including an electric motor and a speed reducer. The electric motor has a rotor having a rotor shaft and an annular stator having a plurality of coil portions protruding toward the rotor side, and the speed reducer has a sun gear attached to an eccentric portion of the rotor shaft, and a ring gear in which internal teeth meshing with external teeth of the sun gear are formed.

CITATION LIST

Patent Document

Patent Document 1: Japanese Patent Application Laid-Open No. 2009-177982

SUMMARY OF THE INVENTION

Problems to be Solved by the Invention

However, in the technology described in Patent Document 1, the electric motor and the speed reducer are made independently from each other. For this reason, in the technology described in Patent Document 1, for example, parts cannot be shared between the electric motor and the speed reducer, and thus the total number of parts inevitably increases.

Accordingly, the present disclosure proposes a novel and improved actuator capable of achieving high output with a smaller number of parts.

Solutions to Problems

According to the present disclosure, there is provided an actuator including a stator that has teeth arranged on an outer peripheral surface, a rotor that rotates around a central axis of the stator while teeth arranged on an outer peripheral surface mesh with the teeth arranged on the outer peripheral surface of the stator, and a second gear that rotates while meshing with a first gear coupled to the rotor coaxially with a central axis of the rotor and is coupled to an output shaft, in which the stator has an electromagnet, the rotor has a magnet, and a magnetic pole of the electromagnet corresponding to a position of the rotor moves along a circumferential direction of the stator.

Furthermore, according to the present disclosure, there is provided an actuator including a stator that has teeth arranged on an outer peripheral surface, a rotor that rotates around a central axis of the stator while teeth arranged on an outer peripheral surface mesh with the teeth arranged on the outer peripheral surface of the stator, a second gear that rotates while meshing with a first gear coupled to the rotor coaxially with a central axis of the rotor and is coupled to an output shaft, and a third gear that is located on an opposite side of the stator with respect to the rotor and rotates while meshing with the teeth arranged on the outer peripheral surface of the rotor, in which one of the stator and the third gear has a magnet, the other of the stator and the third gear has an electromagnet, and a magnetic pole of the electromagnet corresponding to a position of the rotor moves along a circumferential direction of the stator or a circumferential direction of the third gear, so as to cause the third gear to rotate.

Furthermore, according to the present disclosure, there is provided an actuator including a stator that has teeth arranged on an outer peripheral surface, a rotor that rotates around a central axis of the stator while teeth arranged on an outer peripheral surface mesh with the teeth arranged on the outer peripheral surface of the stator, and a second gear that rotates while meshing with a first gear coupled to the rotor coaxially with a central axis of the rotor and is coupled to an output shaft, in which the stator has a predetermined number, which is three or more, of layers along an axial direction of the stator, the teeth are arranged on an outer peripheral surface of each of the predetermined number of layers, each of the predetermined number of layers has a magnet having a predetermined magnetization pattern in a circumferential direction of the layer, the rotor has the predetermined number of electromagnets along an axial direction of the rotor, and a magnetic pole of each of the predetermined number of electromagnets is switched according to a position of the rotor.

Effects of the Invention

As described above, according to the present disclosure, high output can be achieved with a smaller number of parts. Note that the effect described here is not necessarily limited, and may be any effect described in the present disclosure.

BRIEF DESCRIPTION OF DRAWINGS

FIG. 9A is a view for describing a principle of rotation of the rotor 120 according to the present embodiment.

FIG. 16 is a view schematically illustrating a structure of a rotor 120 according to modification example 6 of the present embodiment.

MODE FOR CARRYING OUT THE INVENTION

Figure 1:
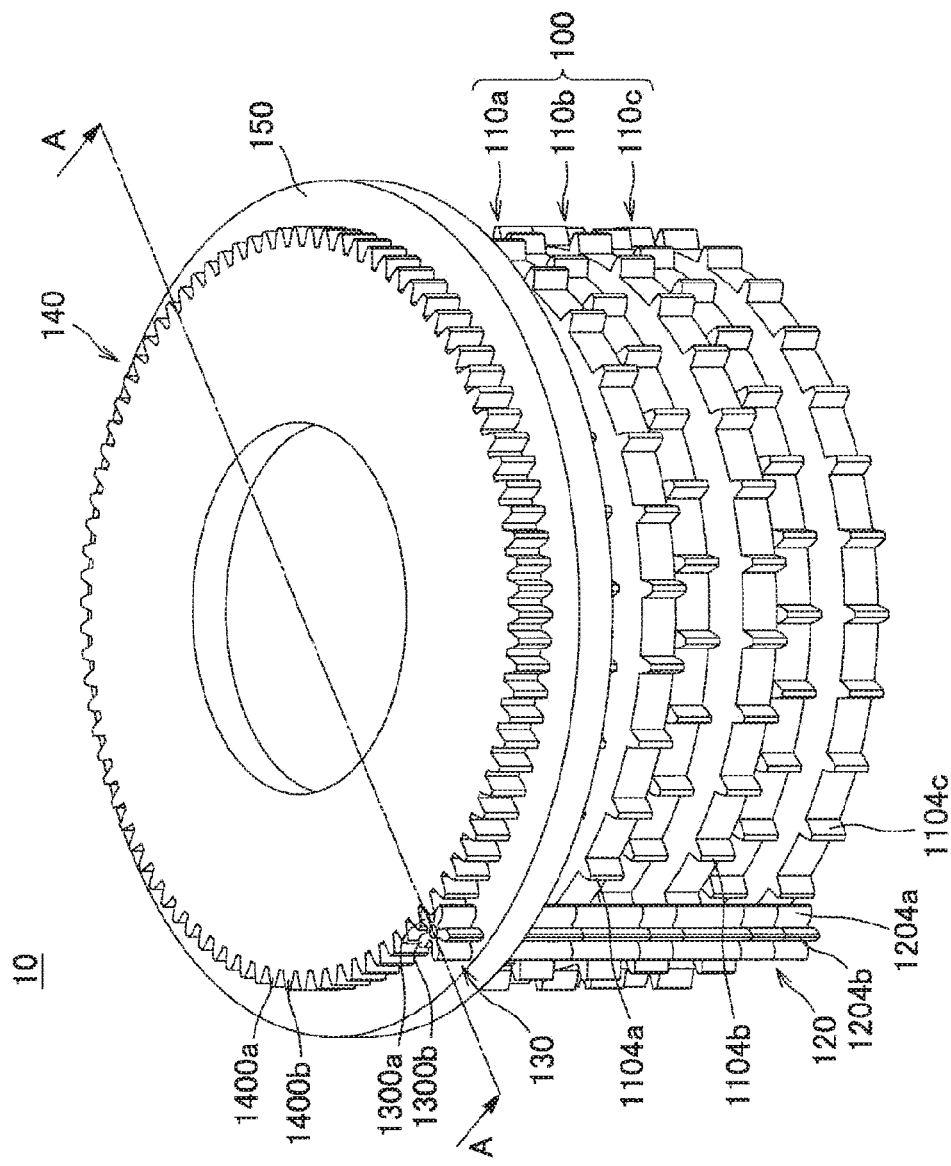
FIG. 1 is a view illustrating an example of an appearance structure of an actuator 10 according to an embodiment of the present disclosure.

Hereinafter, preferred embodiments of the present disclosure will be described in detail with reference to the accompanying drawings. Note that in the description and drawings, components having substantially the same functional structures are given the same reference signs, and duplicated descriptions are omitted.

Furthermore, in the description and drawings, a plurality of components having substantially the same functional structures may be distinguished by adding different alphabets after the same reference signs. For example, a plurality of components having substantially the same functional structures is distinguished as necessary, such as a layer 110a and a layer 110b. However, when it is not necessary to particularly distinguish each of a plurality of components having substantially the same functional structures, only the same reference numerals are given. For example, in a case where there is no need to particularly distinguish a layer 110a and a layer 110b, they are simply referred to as a layer 110.

Furthermore, the "mode for carrying out the invention" will be described in accordance with the following order of items.

1. Background
2. Detailed Description of Embodiment
3. Modification Example
4. Conclusion 1. Background First, in order to clearly illustrate characteristics of the present disclosure, the background of creation of an actuator 10 according to an embodiment of the present disclosure will be described.

Conventionally, a geared motor in which a speed reducer is attached to a motor has been developed. This geared motor can output larger torque than the motor alone by reducing rotation of the motor. However, an existing geared motor is made by combining a motor and a gear which are made independently from each other. That is, in the existing geared motor, the motor and the gear are not integrated. Thus, in the existing geared motor, it is difficult to reduce the total number of parts, and there is a disadvantage that the weight increases.

Accordingly, taking the above circumstances into consideration, the actuator 10 according to the present embodiment has been created. The actuator 10 includes a stator 100 that has teeth 1104 arranged on an outer peripheral surface, a rotor 120 that rotates around a central axis of the stator 100 while teeth 1204 arranged on an outer peripheral surface mesh with the teeth 1104 arranged on the outer peripheral surface of the stator 100, and a sun gear 140 that rotates while meshing with a planetary gear 130 coupled to the rotor 120 coaxially with a central axis of the rotor 120 and is coupled to an output shaft, in which the stator 100 has an electromagnet 1100, the rotor 120 has a magnet 1200, and a magnetic pole of the electromagnet 1100 corresponding to the position of the rotor 120 can move along a circumferential direction of the stator 100. Thus, for example, high output can be achieved with a smaller number of parts as compared with the existing geared motor.

Here, the planetary gear 130 is an example of a first gear according to the present disclosure. Furthermore, the sun gear 140 is an example of a second gear according to the present disclosure. Hereinafter, the contents of such present embodiment will be sequentially described in detail.

2. Detailed Description of Embodiment 2-1. Structure

Figure 2:
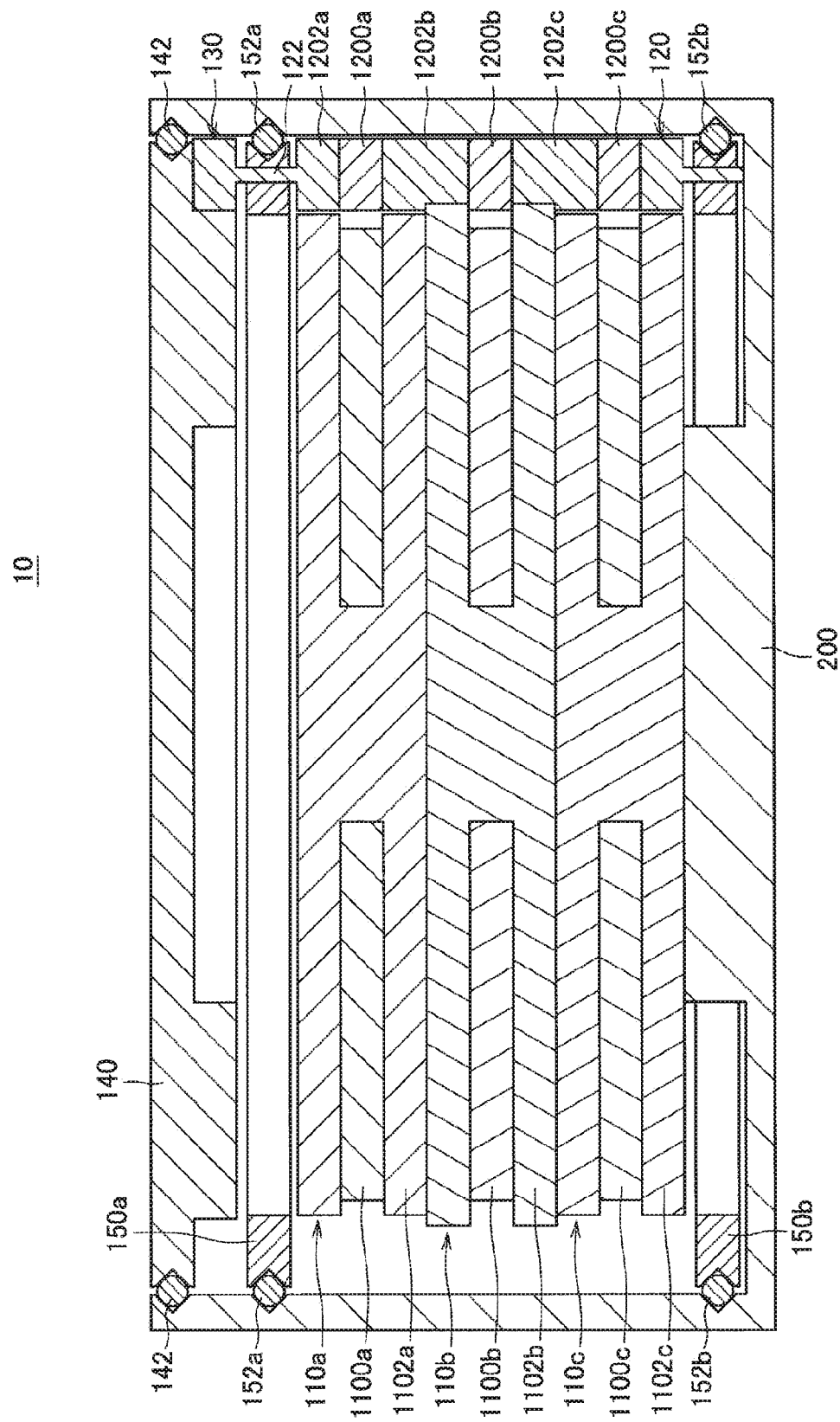
FIG. 2 is a view illustrating an example of a cross section of the actuator 10 taken along a line A-A illustrated in FIG. 1.
Figure 3:
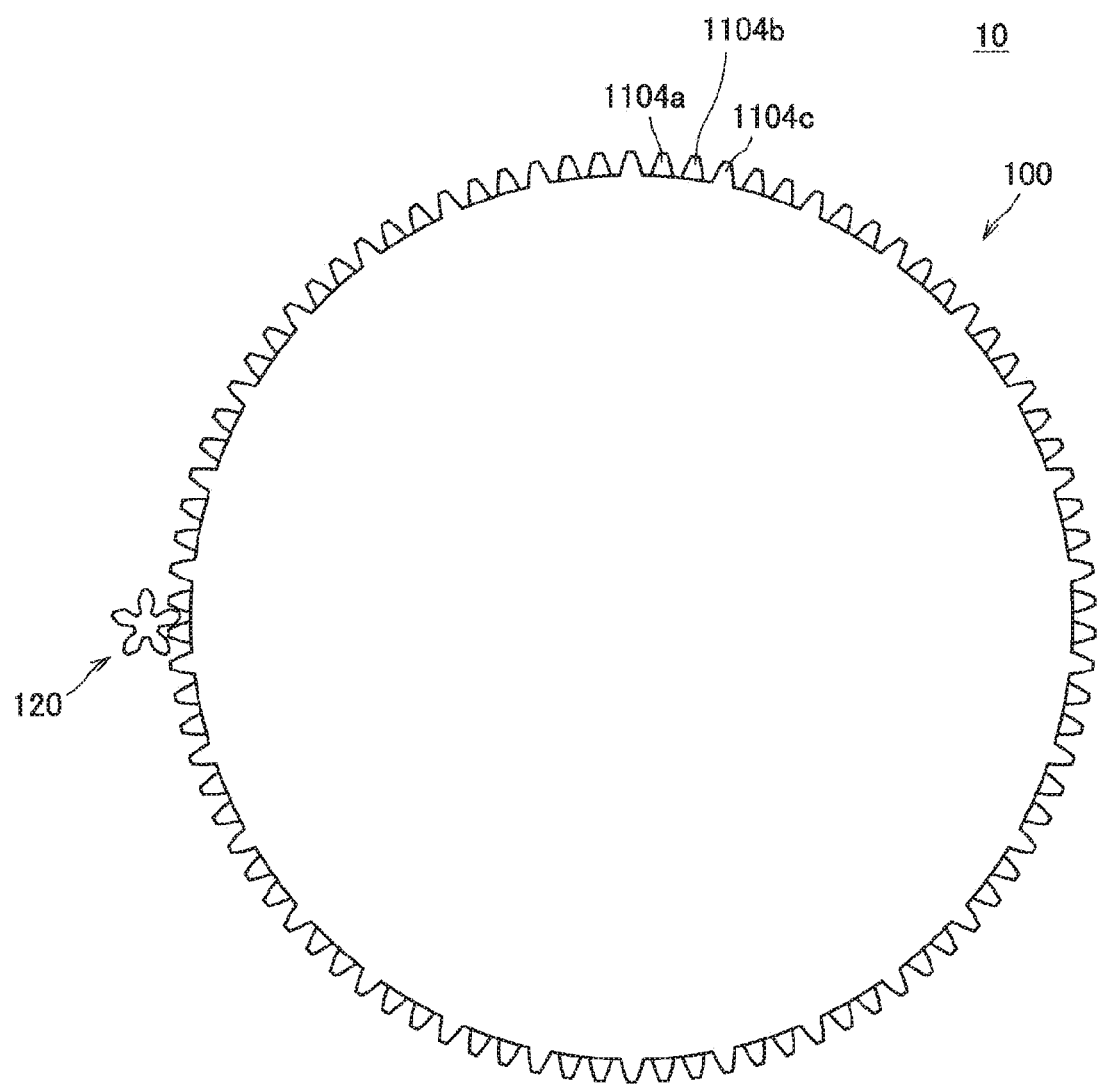
FIG. 3 is a view schematically illustrating a shape of the actuator 10 as viewed from a bottom side of the actuator 10.

First, a structure of the actuator 10 according to the present embodiment will be described mainly with reference to FIGS. 1 to 3. FIG. 1 is a view illustrating an example of an appearance structure of the actuator 10. FIG. 2 is a view illustrating an example of a cross section of the actuator 10 taken along a line A-A illustrated in FIG. 1. FIG. 3 is a view schematically illustrating a shape of the actuator 10 as viewed from a bottom side of the actuator 10.

As illustrated in FIGS. 1 and 2, the actuator 10 has the stator 100, the rotor 120, the planetary gear 130, the sun gear 140, and a carrier 150. Furthermore, as illustrated in FIG. 2, the actuator 10 may further have a housing 200. However, without being limited to such an example, the actuator 10 does not need to have the housing 200.

2-1-1. Stator 100

The stator 100 may have a plurality of electromagnets 1100 and a plurality of magnets (permanent magnets) 1102. Furthermore, as illustrated in FIG. 1, a plurality of teeth 1104 is arranged on the outer peripheral surface of the stator 100. For example, the stator 100 has a predetermined number, which is two or more (for example, three), of layers 110 along an axial direction of the stator 100, and a plurality of teeth 1104 is arranged on an outer peripheral surface of each of the predetermined number of layers 110. More specifically, substantially the same number of teeth 1104 having substantially the same shapes is arranged on the outer peripheral surface of each of the predetermined number of layers 110. Hereinafter, an example in which the predetermined number is "three" will be mainly described.

As illustrated in FIGS. 1 and 2, each of the three layers 110 may have an electromagnet 1100 and a magnet 1102. As illustrated in FIG. 2, a radial length of the magnet 1102 may be designed to be greater than a radial length of the electromagnet 1100.

Furthermore, respective shapes and sizes of the three layers 110 may be substantially the same. For example, shapes of outer peripheral surfaces of the respective layers 110 are substantially the same. More specifically, substantially the same number of teeth 1104 having substantially the same shapes may be arranged on the outer peripheral surface of each of the layers 110 (more specifically, on an outer peripheral surface of the magnet 1102 of each of the layers 110). Furthermore, as illustrated in FIG. 3, as viewed from the axial direction of the stator 100 (a bottom side of the actuator 10 in an example illustrated in FIG. 3), the three layers 110 may be combined so that positions of the individual teeth 1104 arranged on the outer peripheral surfaces of the respective three layers 110 are different from each other. For example, as illustrated in FIG. 3, the three layers 110 are combined so that the individual teeth 1104 arranged on the outer peripheral surfaces of the respective three layers 110 are at substantially equal intervals in the circumferential direction of the outer peripheral surface of the stator 100 as viewed from the axial direction of the stator 100. According to such a structure, as described later, the rotor 120 can smoothly rotate around the central axis of the stator 100.

Moreover, shapes and sizes of the electromagnets 1100 included in the respective layers 110 may be substantially the same. Furthermore, shapes and sizes of the magnets 1102 included in the respective layers 110 may be substantially the same.

Figure 4:
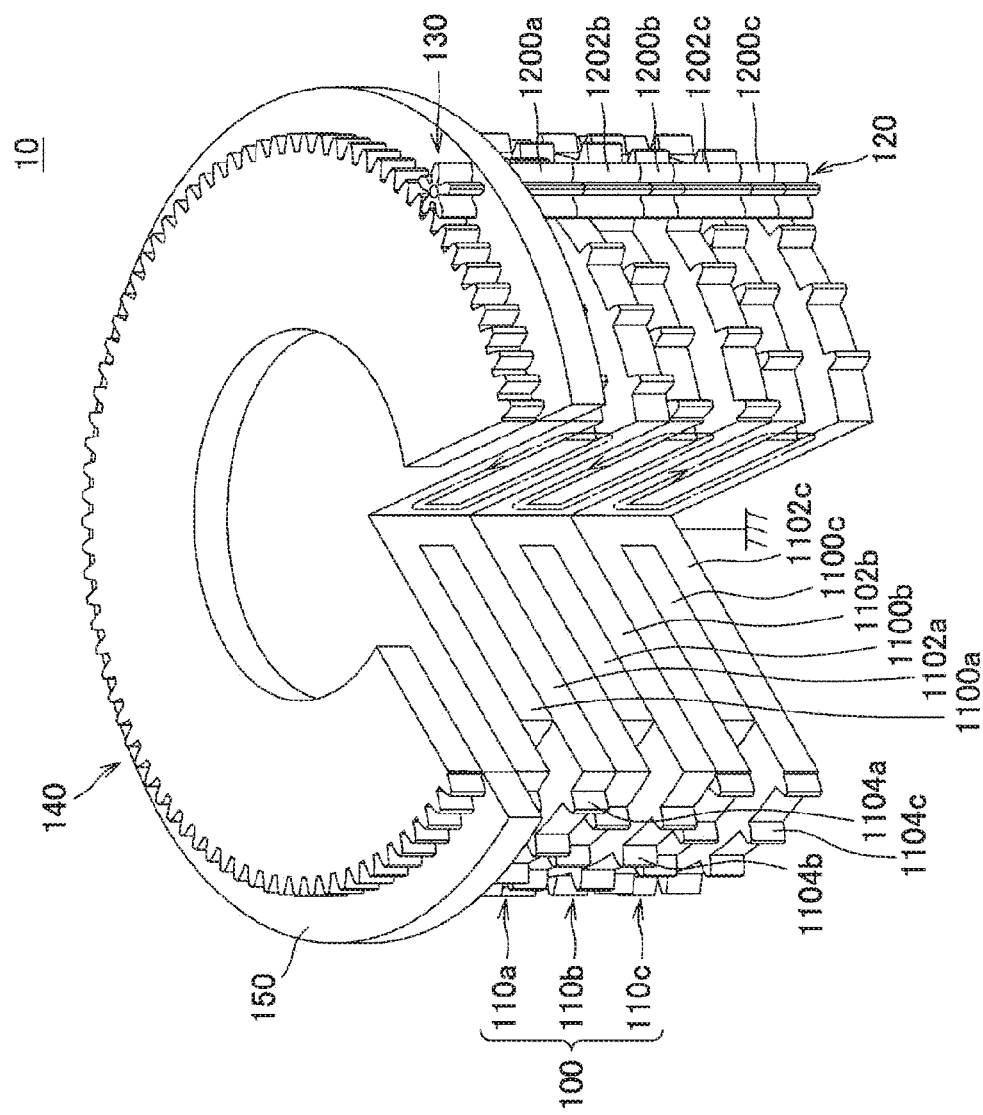
FIG. 4 is a view illustrating a part of an internal structure of the actuator 10 according to the present embodiment.

FIG. 4 is a view illustrating a part of an internal structure of the actuator 10. For example, the electromagnet 1100 of each layer 110 can be energized from a power supply unit (not illustrated) disposed outside the actuator 10 via a power cable (not illustrated) or the like. Moreover, for example, a control unit (not illustrated) disposed outside the actuator 10 can control supply of power to the electromagnet 1100 of each layer 110. Thus, magnetic flux can flow around the electromagnet 1100, for example, as illustrated in FIG. 4. Furthermore, when a direction in which a current is applied to the individual electromagnets 1100 is switched to the opposite direction, each direction in which the magnetic flux flows can be inverted, and each of directions of the magnetic poles of the respective layers 110 can be inverted. For example, the control unit can switch a combination of directions of currents applied to the respective electromagnets 1100 of the three layers 110 according to a lapse of time. Thus, the magnetic pole of the electromagnet 1100 of each layer 110 can move along the circumferential direction of the stator 100, as described later with reference to FIGS. 9A and 9B. As a result, as described later, the rotor 120 can rotate along the circumferential direction of the stator 100.

Here, the control unit may include a processing circuit such as a central processing unit (CPU), a graphics processing unit (GPU), or the like for example. The control unit can control operation of the actuator 10 as a whole. Note that the control unit and the power supply unit are not limited to the example of being disposed outside the actuator 10, and one or more of them may be arranged inside the actuator 10.

2-1-2. Rotor 120

As illustrated in FIG. 1, a plurality of teeth 1204 is arranged on the outer peripheral surface of the rotor 120. The rotor 120 rotates around the central axis of the stator 100 while the individual teeth 1204 arranged on the outer peripheral surface of the rotor 120 and the individual teeth 1104 arranged on the outer peripheral surface of the stator 100 mesh with each other.

Figure 5:
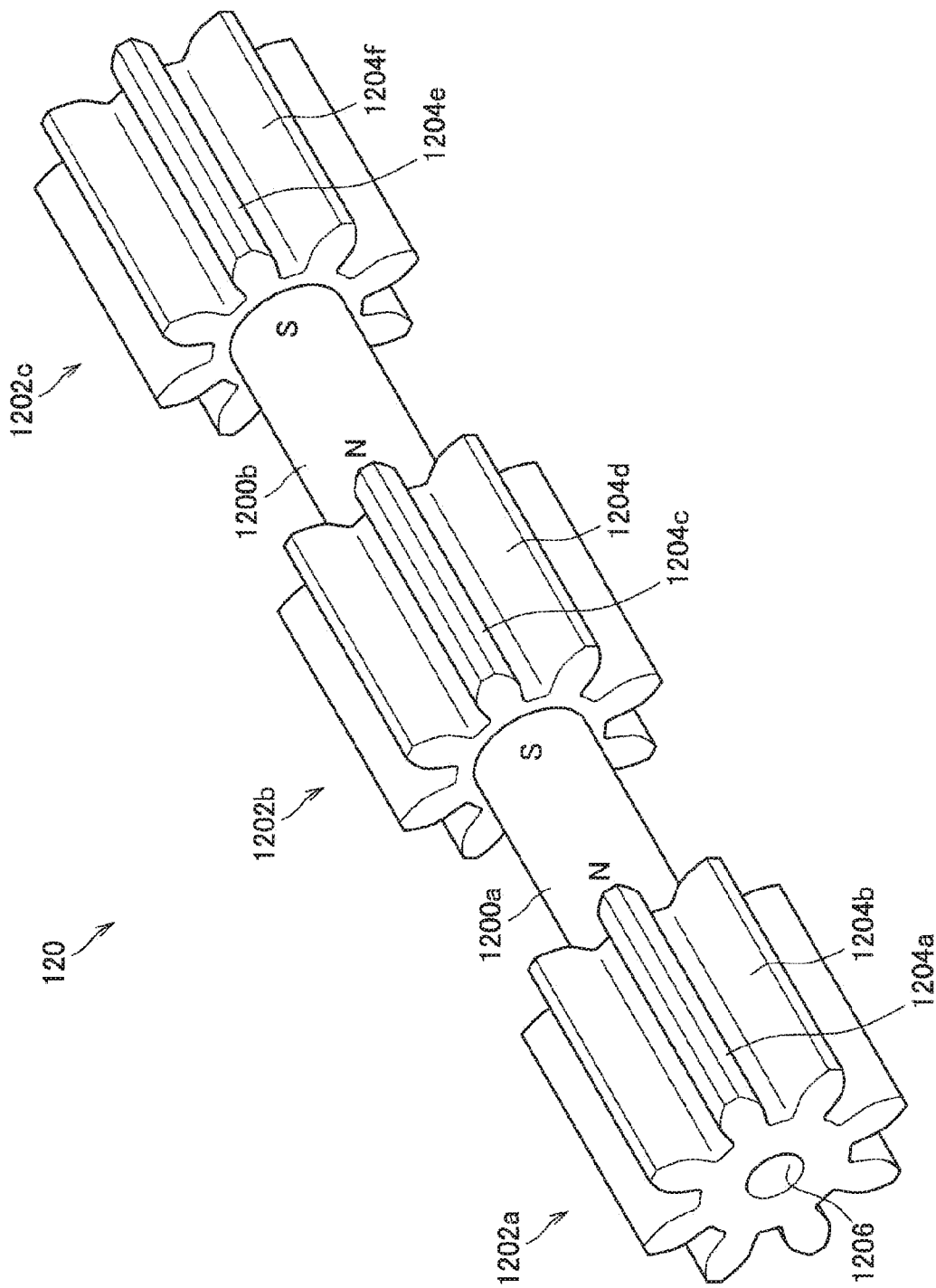
FIG. 5 is a view illustrating an appearance structure of a part of a rotor 120 according to the embodiment.

FIG. 5 is a view illustrating an example of an appearance structure of a part of the rotor 120. As illustrated in FIG. 5, the rotor 120 may have a predetermined number (for example, three) of magnets 1200 along an axial direction of the rotor 120. Note that FIG. 5 illustrates an example in which only two magnets 1200 are disposed for convenience, but without being limited to such an example, three or more magnets 1200 may be disposed. In the following, an example in which the rotor 120 has three magnets 1200 as illustrated in FIGS. 1 and 2 for example will be mainly described.

As illustrated in FIG. 5, the rotor 120 may be made by alternately combining the magnets 1200 and members 1202 one by one along the axial direction of the rotor 120. That is, members 1202 may be disposed respectively between individual adjacent magnets 1200. The members 1202 may include a magnetic material such as iron, for example. Furthermore, as illustrated in FIG. 5, the plurality of teeth 1204 is arranged on an outer peripheral surface of the member 1202. The individual teeth 1204 arranged on the outer peripheral surface of the member 1202 can mesh with the individual teeth 1104 arranged on the outer peripheral surface of the stator 100 (more specifically, each layer 110).

As described above, the rotor 120 is disposed against the stator 100 so that the individual teeth 1204 arranged on the outer peripheral surface of the rotor 120 and the individual teeth 1104 arranged on the outer peripheral surface of the stator 100 mesh with each other. For example, as illustrated in FIG. 4, the rotor 120 is disposed against the stator 100 in a positional relationship such that the electromagnet 1100 included in each of the three layers 110 of the stator 100 and each of the three magnets 1200 of the rotor 120 face each other.

Furthermore, the rotor 120 is coupled to the planetary gear 130 coaxially with the central axis of the rotor 120. For example, as illustrated in FIG. 1, the carrier 150 is disposed between the rotor 120 and the planetary gear 130, and the rotor 120 is coupled to the planetary gear 130. More specifically, as illustrated in FIG. 2, a coupling portion 122 having a rod shape may be disposed among a member 1202a at one end of the rotor 120, a hole (not illustrated) of the carrier 150, and the planetary gear 130. The coupling portion 122 may fix the rotor 120 and the planetary gear 130. For example, the rotor 120 and the planetary gear 130 may be fixed by inserting the coupling portion 122 in a center hole 1206 of the member 1202a illustrated in FIG. 5, the hole of the carrier 150, and a hole (not illustrated) of the planetary gear 130.

2-1-3. Planetary gear 130

The planetary gear 130 rotates around the central axis of the stator 100 along with rotation of the rotor 120 while meshing with the sun gear 140 as described later. Furthermore, the number of teeth of the planetary gear 130 and the number of teeth 1204 arranged on the rotor 120 may be designed to be the same.

Here, the number of teeth 1104 arranged on the outer peripheral surface of the stator 100 may be designed to be smaller by a predetermined number than the number of teeth of the sun gear 140. For example, the number of teeth 1104 arranged on the outer peripheral surface of the stator 100 is N, and the number of teeth of the sun gear 140 is N+1. In this case, the actuator 10 has a reduction ratio of (N+1)/N. Note that N is a predetermined number of two or more.

Moreover, sizes of the teeth 1104 of the stator 100 may be designed to be larger than sizes of the teeth 1400 of the sun gear 140. Similarly, sizes of the teeth 1204 of the rotor 120 may be designed to be larger than sizes of teeth 1300 of the planetary gear 130. For example, the stator 100 and the sun gear 140 may each be designed such that a radial length of the stator 100 and a radial length of the sun gear 140 are substantially the same. In this case, the relationship between the sizes of the teeth 1104 and the sizes of the teeth 1400 of the sun gear 140 may be determined, for example, at the time of design using an addendum modification coefficient, so as to conform to the relationship between the number of teeth 1104 arranged on the outer peripheral surface of the stator 100 and the number of teeth of the sun gear 140.

Figure 6:
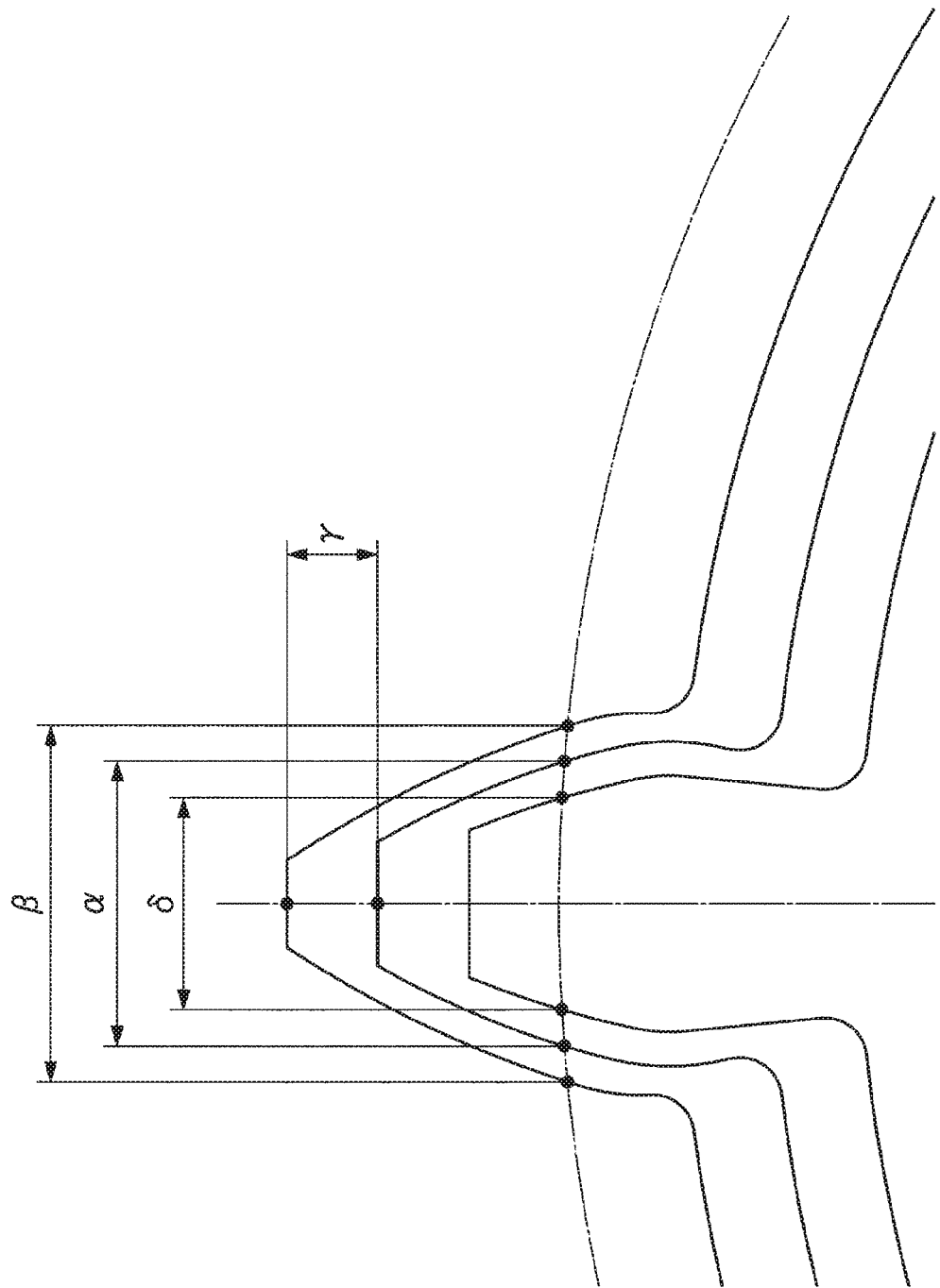
FIG. 6 is a view illustrating an example of a relationship between sizes of teeth arranged on a stator 100 and sizes of teeth of a sun gear 140.

Here, an example of setting a relationship between sizes of the teeth 1104 and sizes of the teeth 1400 of the sun gear 140 will be described with reference to FIG. 6. For example, assuming that the sizes of the teeth 1104 are β, the sizes of the teeth of the sun gear 140 can be determined as α or δ (in equations (1) and (2)) using the following equations (1) and (2). Note that γ in equations (1) and (2) is an addendum modification.

[Equation 1]

$$\beta = \alpha + \{2 \cdot \tan(\text{pressure angle}) \cdot \gamma\} \quad \text{Equation (1)}$$

[Equation 2]

$$\delta = \alpha - \{2 \cdot \tan(\text{pressure angle}) \cdot \gamma\} \quad \text{Equation (2)}$$

Figure 7:
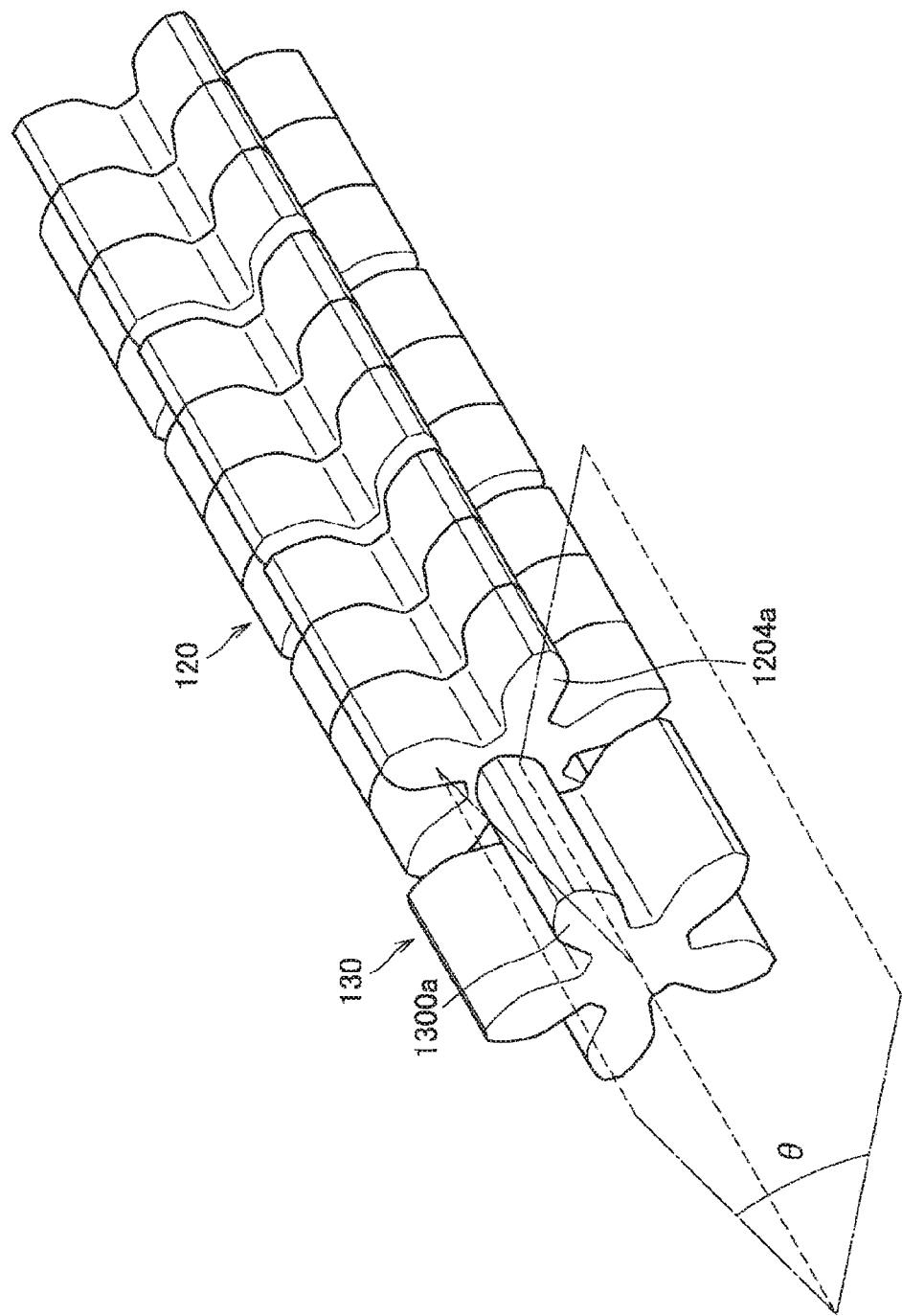
FIG. 7 is a view illustrating an angular difference between teeth arranged on the rotor 120 and teeth of a planetary gear 130.

Note that as described above, the rotor 120 and the planetary gear 130 may be coaxially coupled. In this case, as illustrated in FIG. 7, a predetermined angular difference θ (offset) can be provided between the individual teeth 1204 arranged on the rotor 120 and the individual teeth 1300 of the planetary gear 130. Thus, the teeth 1204 of the rotor 120 and the teeth 1104 of the stator 100 are structured to reliably mesh with each other, and the teeth 1300 of the planetary gear 130 and the teeth 1400 of the sun gear 140 reliably mesh with each other.

2-1-4. Sun gear 140

As illustrated in FIG. 1, the sun gear 140 is disposed inside the planetary gear 130 with respect to the central axis of the stator 100. Furthermore, the sun gear 140 rotates while the teeth 1400 on the outer peripheral surface of the sun gear 140 mesh with the external teeth 1300 of the planetary gear 130. A rotation axis of the sun gear 140 may be coaxial with the central axis of the stator 100.

The sun gear 140 can be supported rotatably around the central axis of the stator 100. For example, as illustrated in FIG. 2, a bearing 142 is disposed between the housing 200 and the sun gear 140. In this case, the bearing 142 supports the sun gear 140 rotatably around the central axis of the stator 100.

Moreover, the sun gear 140 may be coupled to an output shaft (not illustrated) of the actuator 10. However, without being limited to such an example, the sun gear 140 may be the output shaft of the actuator 10.

2-1-5. Carrier 150

The carrier 150 is a ring type. As described above, the carrier 150 is fixed between the rotor 120 and the planetary gear 130.

The carrier 150 can be supported rotatably around the central axis of the stator 100. For example, as illustrated in FIG. 2, a bearing 152 is disposed between the housing 200 and the carrier 150. In this case, the bearing 152 supports the carrier 150 rotatably around the central axis of the stator 100. With the structure described above, when the rotor 120 starts to rotate around the central axis of the stator 100, rotational force of the rotor 120 is transmitted to the carrier 150 fixed to the rotor 120, and thus the carrier 150 can rotate with the rotor 120 around the central axis of the stator 100, for example, as denoted by arrows in FIG. 8.

Note that although FIG. 2 illustrates an example in which one carrier 150 is disposed on each of both ends in the axial direction of the stator 100, the present embodiment is not limited to this example. For example, as illustrated in FIG. 1, only one carrier 150 may be disposed on only one end side (sun gear 140 side) of the stator 100 in the axial direction.

2-1-6. Housing 200

As illustrated in FIG. 2, inside the housing 200, the stator 100, the rotor 120, and the sun gear 140, the bearing 142, the bearing 152, and the like can be disposed. Furthermore, the housing 200 can support the stator 100, the bearing 142, the bearing 152, and the like. Note that the shape of the housing 200 is not particularly limited. For example, the housing 200 may be cylindrical or prismatic (such as a square prism).

2-2. Operation

The structure of the actuator 10 according to the present embodiment has been described above. Next, operation of the actuator 10 based on the above-described structure will be described with reference to FIGS. 8, 9A, 9B, and 10.

2-2-1. Overview

Figure 8:
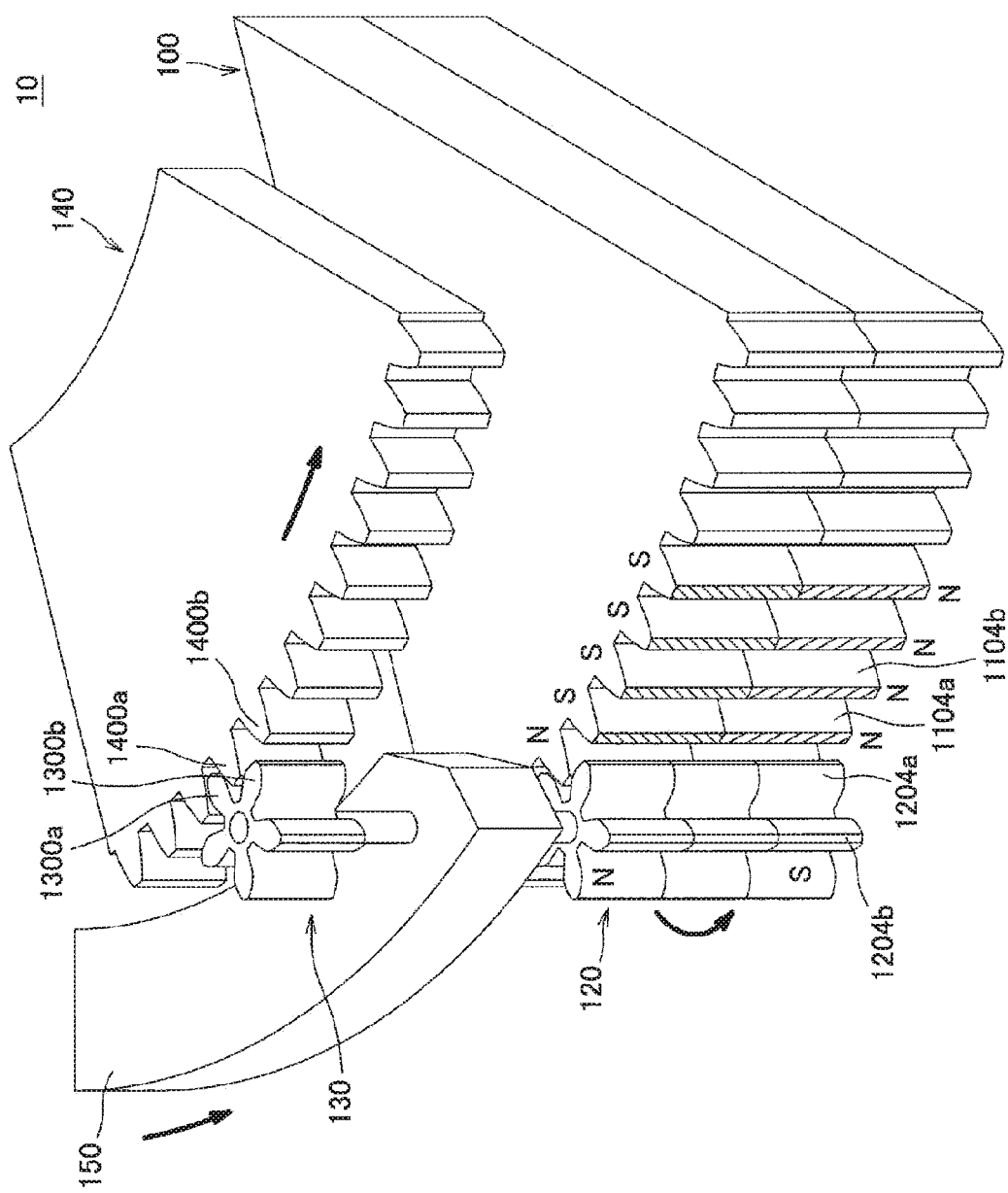
FIG. 8 is a view for describing an overview of an operation of the actuator 10 according to the present embodiment.

First, an overview of the operation of the actuator 10 will be described with reference to FIG. 8. FIG. 8 is a view for describing the overview of the operation of the actuator 10. When the magnetic field of each of the three layers 110 corresponding to the position of the rotor 120 changes appropriately, the rotor 120 starts to rotate around the central axis of the stator 100 while the teeth 1204 arranged on the outer peripheral surface of the rotor 120 mesh with the teeth 1104 arranged on the outer peripheral surface of the stator 100 as illustrated in FIG. 8. Thus, the planetary gear 130 coupled coaxially with the central axis of the rotor 120 starts to rotate (with the rotor 120) around the central axis of the stator 100 while meshing with the sun gear 140. As a result, the sun gear 140 also starts to rotate around the central axis of the stator 100. At this time, output torque can increase according to a ratio (reduction ratio) between the number of teeth 1104 of the stator 100 and the number of teeth of the sun gear 140.

Furthermore, as the rotor 120 rotates, the carrier 150 can also rotate (with the rotor 120) around the central axis of the stator 100.

2-2-2. Principle of Rotation of Rotor 120

Figure 9B:
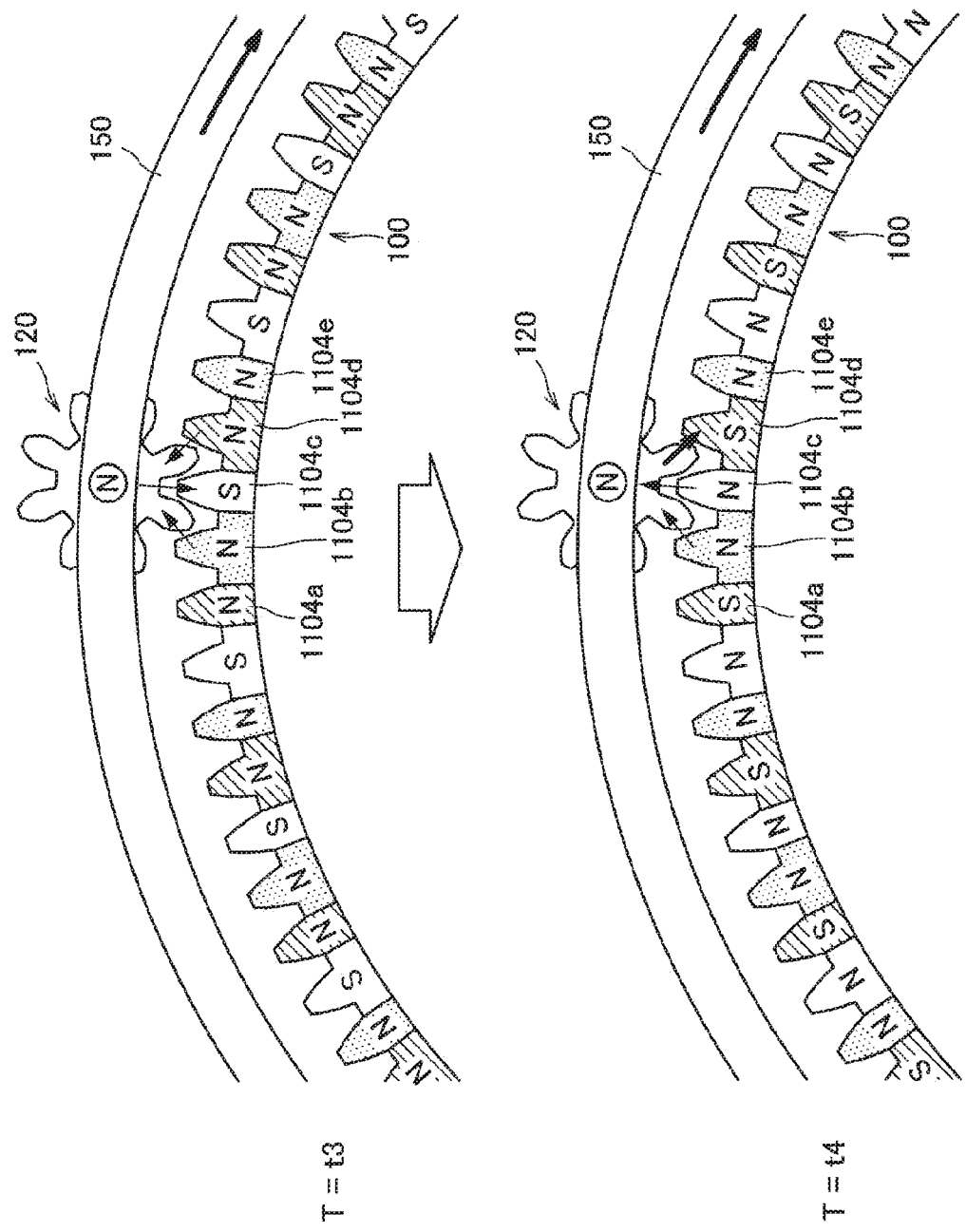
FIG. 9B is a view for describing the principle of rotation of the rotor 120 according to the present embodiment.
Figure 10:
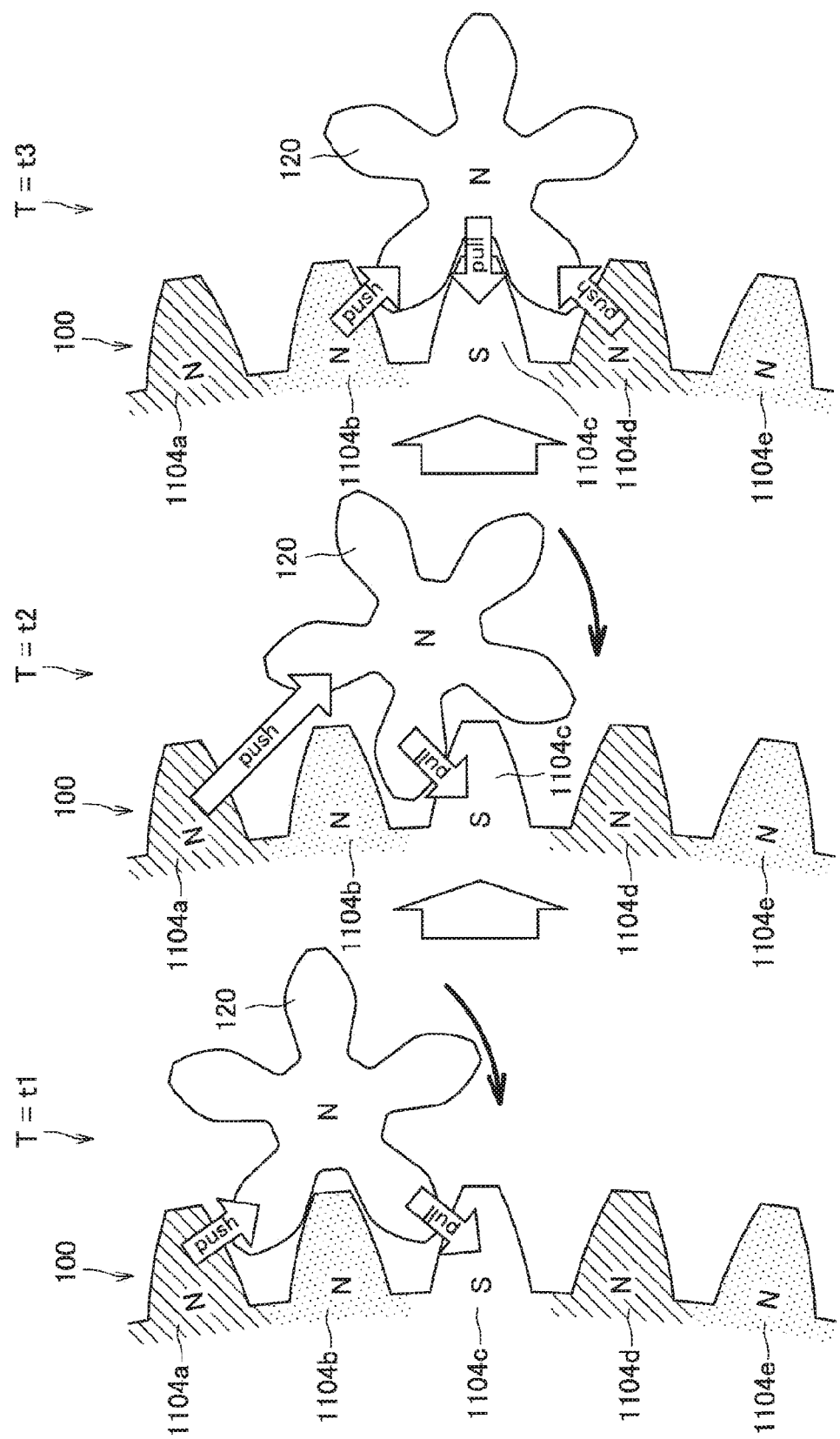
FIG. 10 is another view for describing the principle of rotation of the rotor 120 at each of timings illustrated in FIGS. 9A and 9B.

Next, a principle of rotation of the rotor 120 will be described in more detail with reference to FIGS. 9A, 9B, 10, and 11. FIGS. 9A and 9B illustrate examples of switching of magnetic poles corresponding to positions of the individual teeth 1104 arranged on the outer peripheral surface of the stator 100 (more specifically, each of the three layers 110) as viewed from an upper surface side of the stator 100. FIG. 10 is a view for describing the principle of rotation of the rotor 120 at each of timings illustrated in FIGS. 9A and 9B. In an example illustrated in FIGS. 9A and 9B, the teeth 1104 are arranged along the circumferential direction of the stator 100 in order of teeth 1104a, teeth 1104b, teeth 1104c, teeth 1104d, and teeth 1104e. Note that in FIGS. 9A and 9B, for every layer 110 of the stator 100, a different type of hatching is applied to individual teeth 1104 included in the layer 110. Specifically, the teeth 1104a and the teeth 1104d are included in one layer 110a, the teeth 1104b and the teeth 1104e are included in another layer 110b, and then the teeth 1104c is included in still another layer 110c.

Further, FIGS. 9A, 9B, 10, and 11 illustrate an example in which individual two adjacent timings (that is, between T=t1 and T=t2, between T=t2 and T=t3, and between T=t3 and T=t4) are respectively at equal intervals. Furthermore, FIGS. 9A, 9B, 10, and 11 illustrate an example in which the magnetic pole of the magnet 1200 of the rotor 120 is the N pole as viewed from the upper surface side of the rotor 120.

As illustrated in FIG. 9A, for every layer 110 of the stator 100, a current can be applied to the electromagnet 1100 of each layer 110 so that all magnetic poles corresponding to the individual teeth 1104 included in the layer 110 are the same. For example, at time T=t1 illustrated in FIG. 9A, all the magnetic poles corresponding to the individual teeth 1104 in the layer 110a including the teeth 1104a as viewed from the upper surface side of the stator 100 can be "N poles". Similarly, all the magnetic poles of the individual teeth 1104 in the layer 110b including the teeth 1104b as viewed from the upper surface side of the stator 100 can be "N poles". Furthermore, all the magnetic poles of the individual teeth 1104 in the layer 110c including the teeth 1104c as viewed from the upper surface side of the stator 100 can be "S poles". Thus, as in a view at time t1 illustrated in FIG. 10 for example, the rotor 120 repels the tooth 1104a and the tooth 1104b, and is attracted to the tooth 1104c. As a result, the rotor 120 moves to the right side in FIG. 9A along the circumferential direction of the stator 100 by a predetermined distance (for example, a distance corresponding to substantially half the circumferential length of one tooth 1104).

Figure 11:
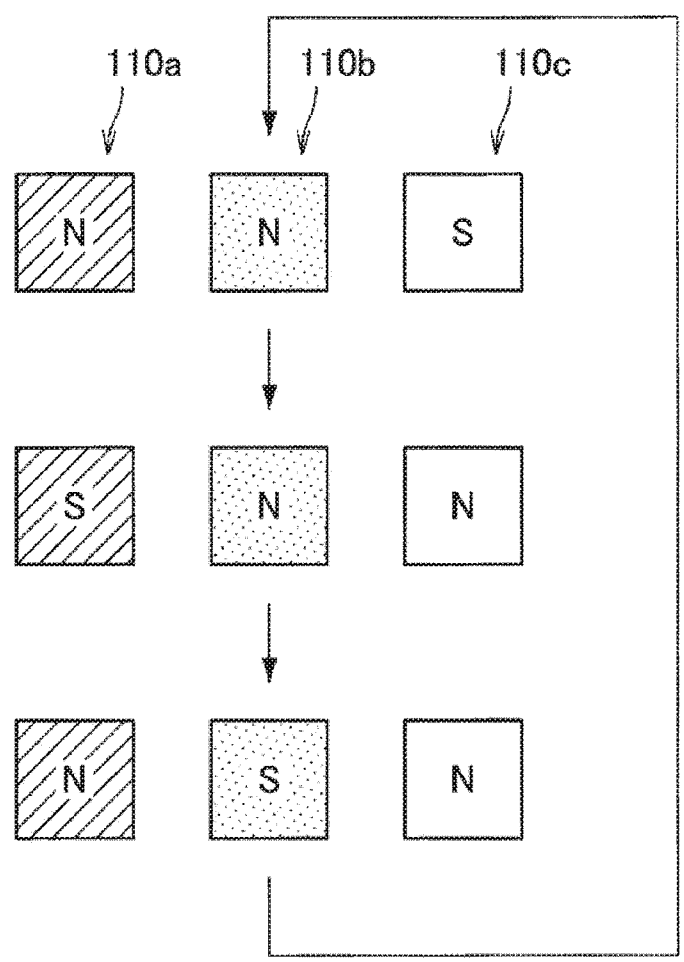
FIG. 11 is a diagram illustrating a transition example of a magnetic pole pattern corresponding to each layer 110 of the stator 100 according to the embodiment.

Moreover, each time the rotor 120 moves along the circumferential direction of the stator 100 from a magnetically unstable position to a magnetically stable position, as illustrated in FIG. 11, a combination (pattern) of magnetic poles corresponding to each layer 110 can be sequentially switched in a predetermined order. For example, the combination of the magnetic poles corresponding to each layer 110 can each be controlled so as to change at each of the same time intervals along a transition order illustrated in FIG. 11. In the example illustrated in FIGS. 9A and 9B, the combination of the magnetic poles corresponding to each layer 110 is (N pole, N pole, S pole) during T=t1 to t3. Then, when T=t4 is reached, the combination of the magnetic poles corresponding to each layer 110 is switched from the above combination to (S pole, N pole, N pole), and this combination is maintained during T=t4 to t6. By performing such control, the rotor 120 can continuously rotate around the central axis of the stator 100.

Hereinafter, the principle described above will be described in more detail. As illustrated in FIG. 10, at time T=t2, the rotor 120 repels each of the teeth 1104a and 1104b, and is attracted to the tooth 1104c. As a result, the rotor 120 moves to the right side in FIG. 9A by the predetermined distance along the circumferential direction of the stator 100 (similarly to time t1).

Moreover, at time T=t3, the rotor 120 repels each of the teeth 1104a, 1104b, and 1104d, and is attracted to the tooth 1104c. Thus, the rotor 120 can move to the right side in FIG. 9A by the predetermined distance along the circumferential direction of the stator 100 (similarly to time t1). Then, for example, immediately before reaching T=t4, a force vector acting on the rotor 120 from the tooth 1104a side and a force vector acting on the rotor 120 from the tooth 1104d side cancel each other. Thus, the rotor 120 can be magnetically stabilized.

Thereafter, as illustrated in FIG. 9B, at time T=t4, the direction of the current applied to the electromagnets 1100 of the respective layers 110 is switched so that all the magnetic poles corresponding to the individual teeth 1104 in the layer 110a including the teeth 1104a (as viewed from the upper surface side of the stator 100) are "S poles", all the magnetic poles of the individual teeth 1104 in the layer 110b including the teeth 1104b are "N poles", and all the magnetic poles of the individual teeth 1104 in the layer 110c including the teeth 1104c are "N poles". Thus, the rotor 120 repels each of the teeth 1104b and the teeth 1104c, and is attracted to the teeth 1104d. In other words, the rotor 120 changes from a magnetically stable state to a magnetically unstable state. As a result, the rotor 120 moves to the right side in FIG. 9A along the circumferential direction of the stator 100 by a predetermined distance (for example, a distance corresponding to substantially half the circumferential length of one tooth 1104).

As described above, according to the present embodiment, supply of power to the electromagnet 1100 included in each of the three layers 110 can be controlled so that the magnetic poles corresponding to the positions of the individual teeth 1104 arranged on the outer peripheral surfaces of the respective three layers 110 are respectively switched according to the position of the rotor 120. Thus, the direction of the magnetic field (magnetic flux) generated around the electromagnet 1100 included in each of the three layers 110 can be also switched according to the position of the rotor 120. As a result, by repeating magnetic attraction of the rotor 120 to the stator 100 and magnetic repelling of the rotor 120 from the stator 100, the rotor 120 can rotate around the central axis of the stator 100.

2-3. Effects 2-3-1. Effect 1

As described above, according to the present embodiment, the planetary gear 130 is combined with the rotor 120 coaxially with the central axis of the rotor 120. Then, these parts are arranged so that the teeth 1204 of the rotor 120 and the teeth 1104 of the stator 100 mesh with each other, and the planetary gear 130 and the sun gear 140 mesh with each other. That is, the stator 100, the rotor 120, the planetary gear 130, and the sun gear 140 can be integrally combined. Therefore, for example, since other parts for connecting these parts one another are not necessary, the total number of parts can be reduced as compared with an existing actuator (such as a geared motor).

Therefore, the actuator 10 according to the present embodiment can achieve high output with a smaller number of parts. For example, the actuator 10 can achieve high output with a smaller weight. As a result, a torque-to-weight ratio (torque per unit weight) can increase. Moreover, since the total number of parts can be reduced, reduction in manufacturing costs can be expected as compared with existing actuators.

2-3-2. Effect 2

Furthermore, according to the present embodiment, the rotor 120 and the stator 100 are arranged so that the teeth 1204 arranged on the outer peripheral surface of the rotor 120 mesh with the teeth 1104 arranged on the outer peripheral surface of the stator 100. Accordingly, there may be zero air gap (that is, a space between the stator 100 and the rotor 120). Therefore, high output (increase in output torque) can be achieved without increasing the size of the actuator 10.

Furthermore, with this structure, a bearing for supporting the rotation of the rotor 120 is not necessary. Thus, the total number of parts can be further reduced.

2-3-3. Effect 3

Although details will be described later with reference to FIG. 15, according to the present embodiment, the actuator 10 can further include a large number of rotors 120 and a large number of planetary gears 130. Thus, the gears of the actuator 10 are stronger than, for example, those of an existing planetary gear speed reducer or the like, and are not easily damaged. For example, in the existing technology, the number of teeth in contact at the same time is small, and thus a large force can be applied at contact points. On the other hand, according to the present embodiment, since the actuator 10 includes the large number of rotors 120, the number of teeth in contact at the same time increases, and thus the force can be dispersed among the large number of rotors 120 (gears). Therefore, each rotor 120 (gear) is unlikely to be damaged.

3. Modification Examples

This embodiment is not limited to the above-described example, and various modification examples can be applied. Next, modification examples of the present embodiment will be described in "3-1. Modification example 1" to "3-7. Modification example 7".

3-1. Modification Example 1

Figure 12:
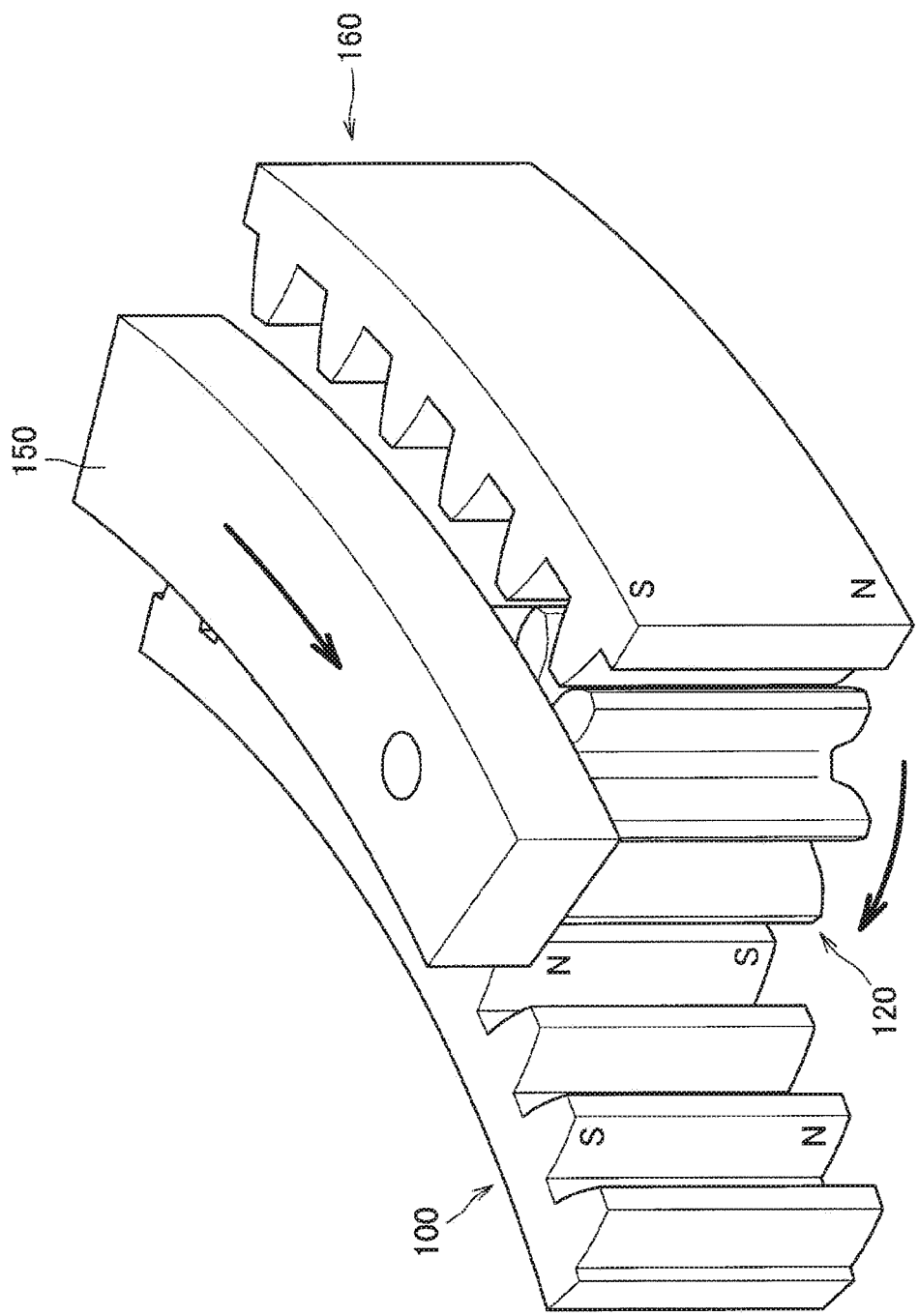
FIG. 12 is a view schematically illustrating a structure in which a ring gear 160 supports the rotor 120 according to modification example 1 of the present embodiment.

In the above description, an example in which the carrier 150 supports the rotor 120 has been described, but the present disclosure is not limited to such an example. For example, as illustrated in FIG. 12, a ring gear 160 disposed on an opposite side of the stator 100 with respect to the rotor 120 may support the rotor 120. Two patterns of specific structures of this modification example will be described below in "3-1-1. Pattern 1" and "3-1-2. Pattern 2".

3-1-1. Pattern 1

First, a structure according to pattern 1 of the present modification example will be described. In pattern 1, the ring gear 160 may have a magnet (not illustrated). Moreover, the ring gear 160 can rotate around the central axis of the stator 100 while the teeth 1204 arranged on the outer peripheral surface of the rotor 120 mesh with teeth of the ring gear 160. Note that unlike the above-described embodiment, the rotor 120 has no magnet 1200 at all, and may include only a magnetic material such as iron, for example.

With this structure according to pattern 1, the magnetic pole, which corresponds to the position of the rotor 120, of the electromagnet 1100 included in each layer 110 of the stator 100 can move along the circumferential direction of the stator 100, so as to cause the ring gear 160 to rotate around the central axis of the stator 100. More specifically, the movement of the magnetic poles allows the ring gear 160 to rotate around the central axis of the stator 100 while the teeth (internal teeth) of the ring gear 160 mesh with the teeth 1204 of the rotor 120. Then, as the ring gear 160 rotates, the rotor 120 can rotate around the central axis of the stator 100 while the teeth 1204 of the rotor 120 mesh with the teeth 1104 of the stator 100. As a result, as the planetary gear 130 coupled to the rotor 120 rotates, the sun gear 140 can rotate around the central axis of the stator 100.

3-1-2. Pattern 2

Next, a structure according to pattern 2 of the present modification example will be described. In pattern 2, the ring gear 160 has three layers (not illustrated) along an axial direction of the ring gear 160, and each of the three layers can have an electromagnet (not illustrated). Furthermore, unlike the above-described embodiment, each layer 110 of the stator 100 basically has no electromagnet 1100. Note that the ring gear 160 can rotate around the central axis of the stator 100 while the teeth of the ring gear 160 mesh with the teeth 1204 of the rotor 120 (similarly to pattern 1). Furthermore, the rotor 120 may include only a magnetic material.

With the structure according to pattern 2, the magnetic pole, which corresponds to the position of the rotor 120, of the electromagnet included in each layer of the ring gear 160 can move along the circumferential direction of the ring gear 160, so as to cause the ring gear 160 itself to rotate around the central axis of the stator 100. That is, the ring gear 160 can rotate around the central axis of the stator 100 while the magnetic pole of the electromagnet included in each layer of the ring gear 160 is switched along the circumferential direction of the ring gear 160. More specifically, the movement of the magnetic pole allows the ring gear 160 to rotate around the central axis of the stator 100 while the teeth of the ring gear 160 mesh with the teeth 1204 of the rotor 120. Then, as the ring gear 160 rotates, the rotor 120 can rotate around the central axis of the stator 100 while the teeth 1204 of the rotor 120 mesh with the teeth 1104 of the stator 100. As a result, as the planetary gear 130 coupled to the rotor 120 rotates (similarly to pattern 1 described above), the sun gear 140 can rotate around the central axis of the stator 100.

3-2. Modification Example 2

Figure 13:
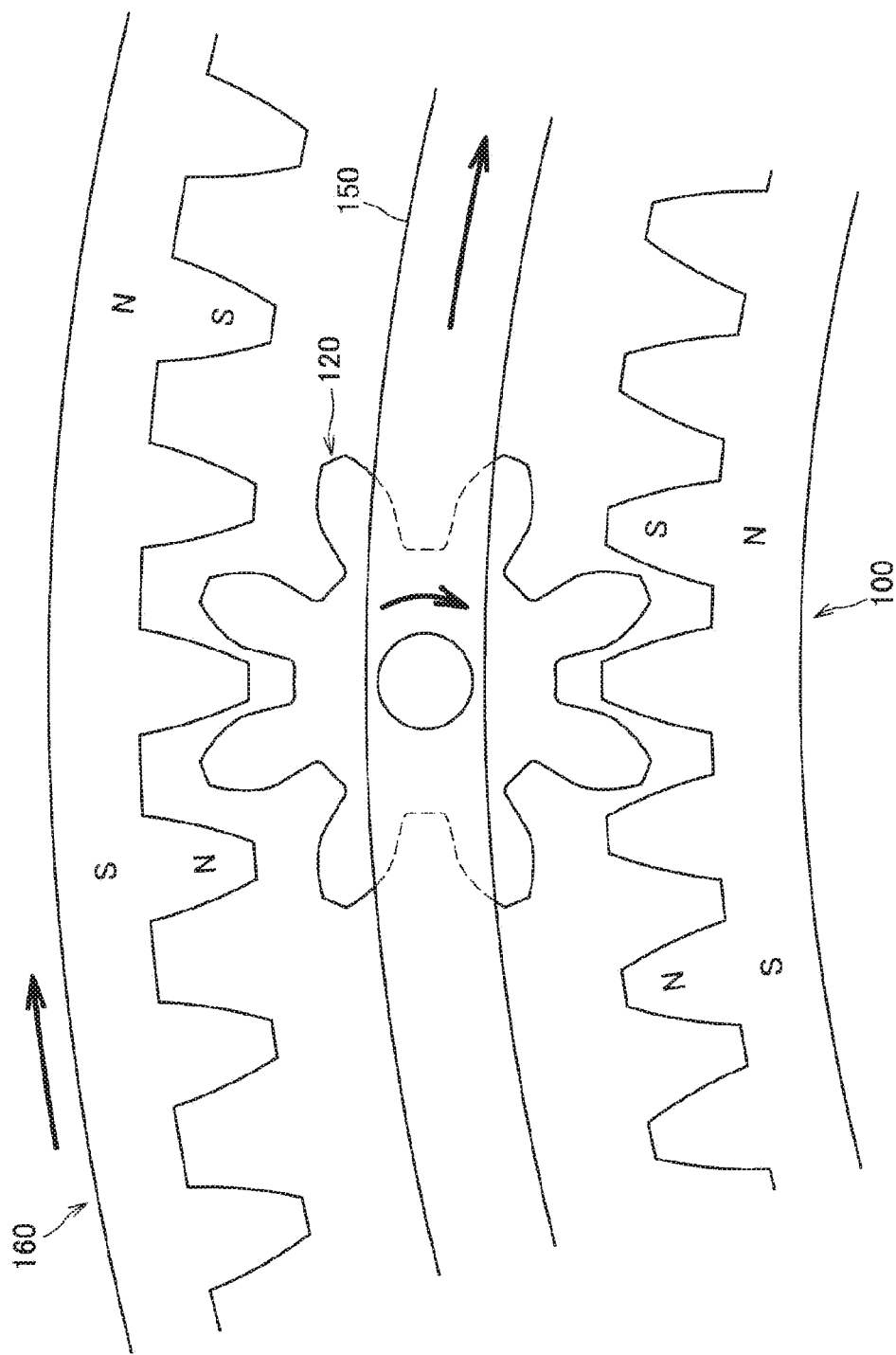
FIG. 13 is a view schematically illustrating an example of a magnetic orientation of a magnet 1102 of a stator 100 according to a second modification example of the present embodiment.

Furthermore, in the above-described embodiment, as illustrated in FIG. 8, the example in which the magnetic orientation of the magnet 1102 included in each layer 110 of the stator 100 is in the axial direction of the stator 100 has been described, but the present disclosure is not limited to such an example. As another modification example, as illustrated in FIG. 13, for example, the magnetic orientation of the magnet 1102 may be in the radial direction of the stator 100.

Figure 14:
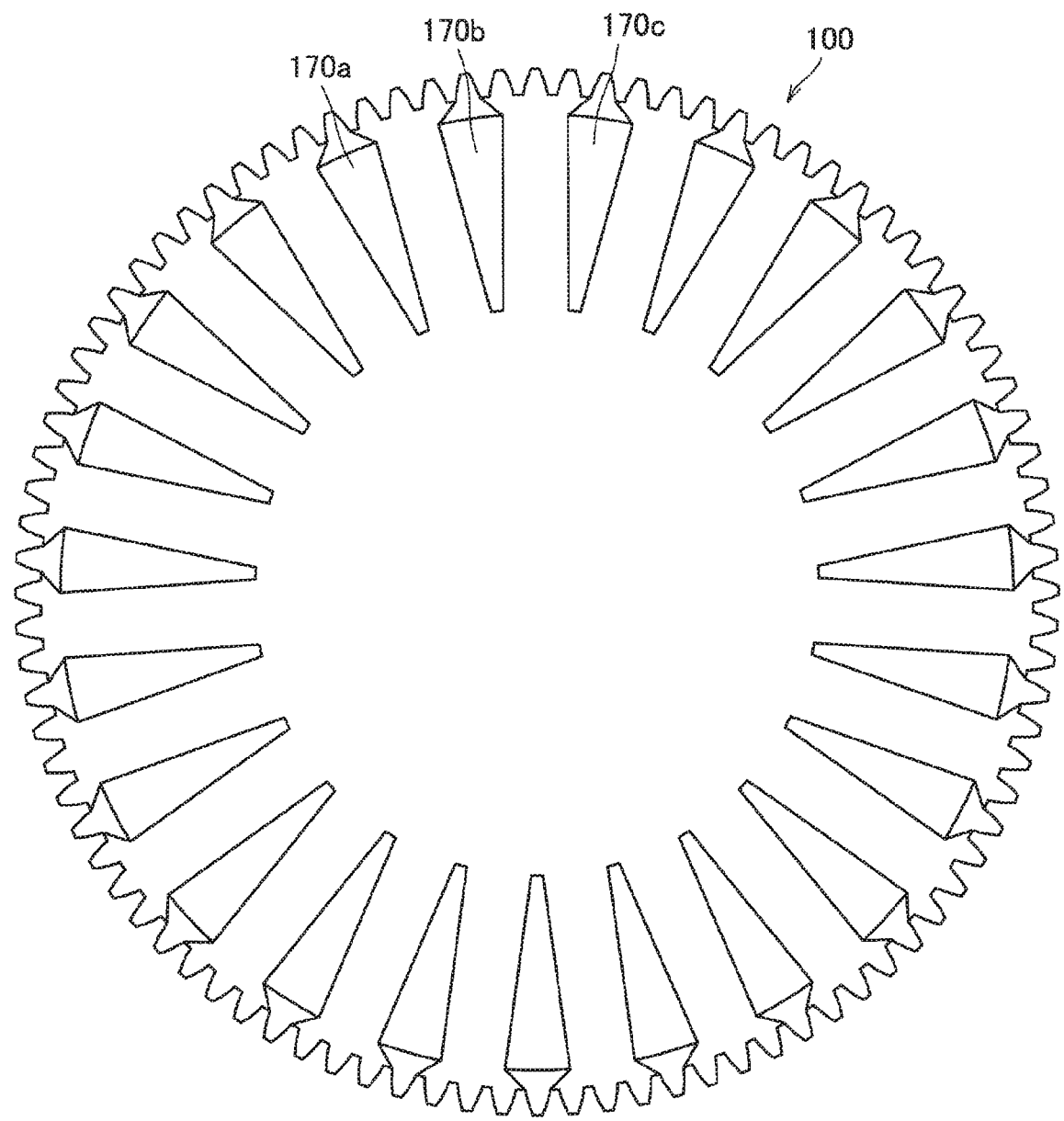
FIG. 14 is a view schematically illustrating a cross section of the stator 100 orthogonal to an axial direction of the stator 100 according to modification example 2 of the present embodiment.

In this modification example, as illustrated in FIG. 14 for example, each layer 110 of the stator 100 may include a plurality of slots (slot-coils) 170 for disposing the electromagnet 1100. FIG. 14 is a view schematically illustrating a cross section of one layer 110 in a direction orthogonal to the axial direction of the stator 100 according to this modification example. As illustrated in FIG. 14, each of the plurality of slots 170 in each layer 110 may be disposed at substantially equal intervals in the circumferential direction of the layer 110.

Moreover, the "pattern 1 of modification example 1" described above and this modification example ("modification example 2") may be combined. Specifically, each layer 110 of the stator 100 has an electromagnet 1100 and a magnet 1102. Then, the ring gear 160 has one or more (for example, three) magnets having magnetic orientations in a radial direction of the ring gear 160. Also in this case, operations substantially similar to the operations described in section 3-1-1 can be achieved.

3-3. Modification Example 3

In the "modification example 1" described above, the example in which the ring gear 160 is a gear having teeth that mesh with the teeth 1204 of the rotor 120 has been described, but the present disclosure is not limited to such an example. As another modification example, the ring gear 160 may be a gear (internal gear) having teeth that mesh with the teeth 1300 of the planetary gear 130. The ring gear 160 according to this modification example is an example of a second gear according to the present disclosure.

In the present modification example, the ring gear 160 is disposed outside the planetary gear 130 with respect to the central axis of the stator 100. Furthermore, a rotation axis of the ring gear 160 may be coaxial with the central axis of the stator 100. For example, the ring gear 160 rotates around the central axis of the stator 100 while the individual teeth (internal teeth) of the ring gear 160 mesh with the individual teeth 1300 of the planetary gear 130.

3-4. Modification Example 4

In the above-described embodiment, the example in which the output shaft is coupled to the sun gear 140 (or the sun gear 140 is the output shaft) has been described, but the present disclosure is not limited to such an example. As another modification example, the output shaft may be coupled to the carrier 150 (instead of the sun gear 140), or the carrier 150 may be the output shaft. Alternatively, the output shaft may be coupled to the ring gear 160 according to the above "modification example 3", or the ring gear 160 according to "modification example 3" may be the output shaft.

3-5. Modification Example 5

Furthermore, in the above-described embodiment, an example in which the actuator 10 includes only one rotor 120 as illustrated in FIG. 1 and the like is mainly described, but the present disclosure is not limited to such an example. For example, as illustrated in FIG. 15, the actuator 10 may include a plurality of the rotors 120. FIG. 15 is a view illustrating an example of an appearance structure of an actuator 10 according to this modification example.

3-5-1. Structure

Figure 15:
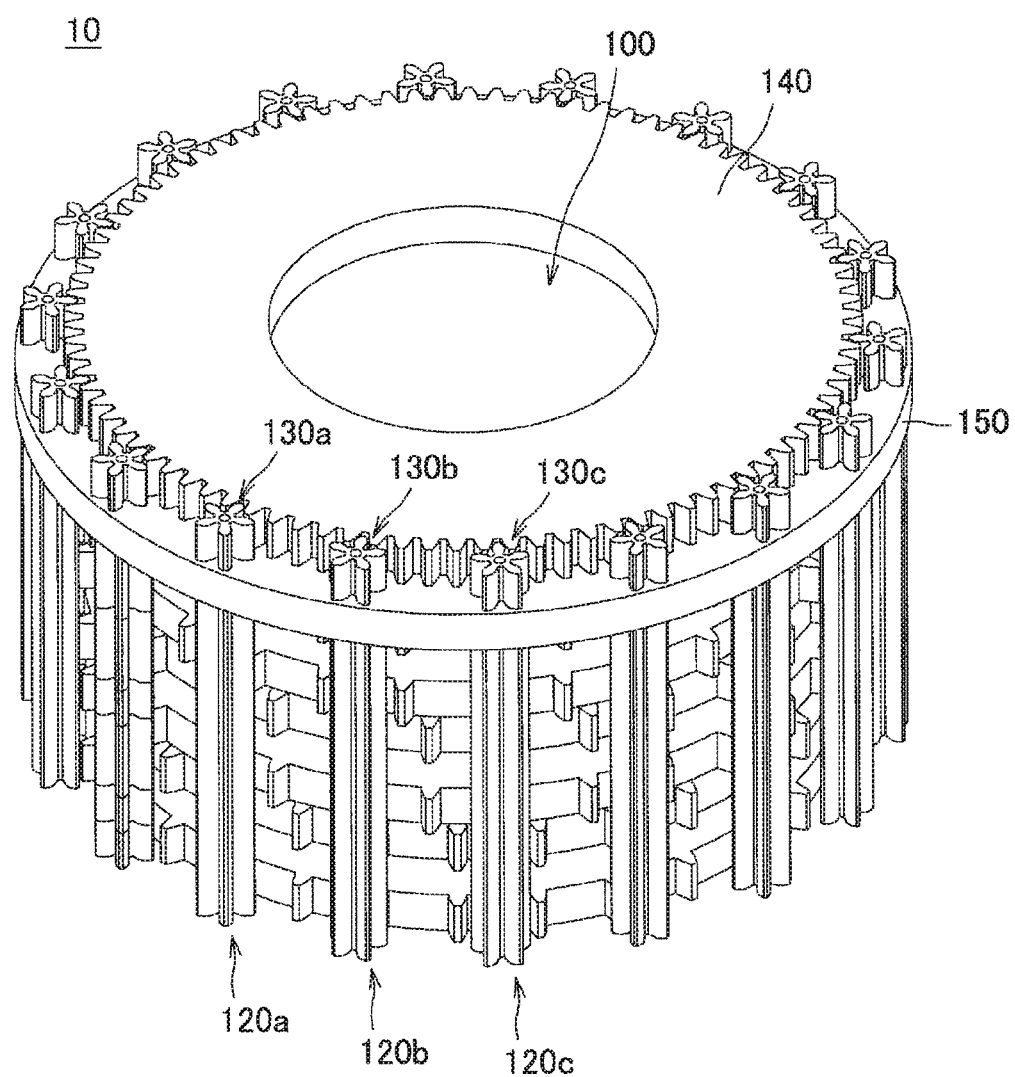
FIG. 15 is a view illustrating an example of an appearance structure of an actuator 10 according to modification example 5 of the present embodiment.

As illustrated in FIG. 15, in this modification example, each of individual rotors 120 can rotate around a central axis of a stator 100 while teeth arranged on an outer peripheral surface of this rotor 120 mesh with teeth 1104 arranged on an outer peripheral surface of the stator 100. Furthermore, the plurality of rotors 120 may be disposed respectively at substantially equal intervals in a circumferential direction of the outer peripheral surface of the stator 100. In this modification example, magnetic poles of electromagnets 1100 included in respective layers 110 of the stator 100 corresponding to respective positions of the plurality of rotors 120 are controlled so as to move along the circumferential direction of the stator 100.

3-5-2. Effects

In this modification example, as illustrated in FIG. 15, for example, the actuator 10 includes a large number of rotors 120 and a large number of planetary gears 130. Thus, since the large number of planetary gears 130 each rotate while meshing with the sun gear 140, there is an advantage that the sun gear 140 is less likely to break. For example, in an existing wave gear reducer, an external gear (more specifically, flex spline) on the input shaft side and an internal gear (more specifically, circular spline) on the output shaft side rotate while only two teeth mesh with each other. On the other hand, in the actuator 10 according to this modification example, since each of the large number of planetary gears 130 and the sun gear 140 rotate while simultaneously meshing with each other, each gear is less likely to break than in the existing wave gear reducer.

Furthermore, the actuator 10 according to this modification example can include the number of planetary gears 130 that is larger than the number of planetary gears in the existing planetary gear speed reducer. Accordingly, each gear is less likely to break than in the existing planetary gear speed reducer.

3-6. Modification Example 6

Furthermore, in the above-described embodiment, the example in which the stator 100 has the electromagnet 1100 and the magnet 1102 and the rotor 120 has the magnet 1200 has been described, but the present disclosure is not limited to such an example. As another modification example, the stator 100 may have no electromagnet 1100, and the rotor 120 may have an electromagnet instead of the magnet 1200.

3-6-1. Structure

Hereinafter, specific contents of this modification example will be described. In this modification example, the stator 100 has three layers 110, and each of the three layers 110 has a magnet 1102 having a predetermined magnetization pattern in a circumferential direction of the layer 110. Here, the predetermined magnetization pattern may be a pattern in which N poles and S poles are alternately magnetized at every predetermined interval (for example, an interval of one or more teeth 1104 or the like) in the circumferential direction of each layer 110. Note that as described above, each layer 110 does not have the electromagnet 1100.

FIG. 16 is a view schematically illustrating a structure of a rotor 120 according to this modification example. As illustrated in FIG. 16, the rotor 120 according to this modification example has three electromagnets 1210 along an axial direction of the rotor 120. For example, each of the three electromagnets 1210 can be energized from a power supply unit disposed outside the actuator 10 via a power cable or the like. Moreover, for the direction of a current applied to each of the three electromagnets 1210, supply of power to each of the three electromagnets 1210 can be further controlled by the above-described control unit. Thus, magnetic flux flows around each of the electromagnets 1210, for example, as illustrated by a dot-and-dash line in FIG. 16. Furthermore, when a direction in which a current is applied to each of the individual electromagnets 1210 is switched to the opposite direction, each direction in which the magnetic flux flows can be inverted, and each of directions of the magnetic poles of the electromagnets 1210 can be inverted. For example, the control unit can switch a combination of directions of currents applied to the individual electromagnets 1210 according to a lapse of time.

Furthermore, the rotor 120 is disposed with respect to the stator 100 in a positional relation such that the magnet 1102 included in each of the three layers 110 of the stator 100 and each of the three electromagnets 1210 included in the rotor 120 face each other.

3-6-2. Operation

With the structure according to this modification example, supply of power to the three electromagnets 1210 is controlled so that each of the magnetic poles of the three electromagnets 1210 included in the rotor 120 is switched according to the position of the rotor 120. Thus, the direction of each of the magnetic poles of the three electromagnets 1210 is also switched according to the position of the rotor 120. As a result, by each of the three electromagnets 1210 being attracted to the stator 100 and repelling from the stator 100 repeatedly along the circumferential direction of the stator 100, the rotor 120 can rotate around the central axis of the stator 100. More specifically, the rotor 120 can rotate around the central axis of the stator 100 while teeth 1204 of the rotor 120 mesh with teeth 1104 of the stator 100.

3-7. Modification Example 7

Furthermore, in the present embodiment, the design of the actuator 10 can be appropriately changed so that a mechanical ratio (such as a reduction ratio) and a magnetic orientation of the magnet 1102 (of the stator 100) are optimized. For example, a gap may be appropriately added between any parts. Furthermore, one or more holes (for example, holes passing through the central axis of the stator 100 and penetrating in the axial direction) may be provided in the stator 100.

4. Conclusion

The preferred embodiments of the present disclosure have been described in detail above with reference to the accompanying drawings, but the present disclosure is not limited to such examples. It is obvious that a person having ordinary knowledge in the technical field to which the present disclosure belongs can conceive various change examples or modification examples within the scope of the technical idea described in the claims. Of course, it is understood that these change examples or modification examples also belong to the technical scope of the present disclosure.

Furthermore, the effects described in the present description are merely illustrative or exemplary and are not limited. That is, the technology according to the present disclosure can exhibit other effects that are apparent to those skilled in the art from the present description in addition to or instead of the effects described above.

Note that the following structures also belong to the technical scope of the present disclosure.

(1)

An actuator including:

a stator that has teeth arranged on an outer peripheral surface;

a rotor that rotates around a central axis of the stator while teeth arranged on an outer peripheral surface mesh with the teeth arranged on the outer peripheral surface of the stator; and a second gear that rotates while meshing with a first gear coupled to the rotor coaxially with a central axis of the rotor and is coupled to an output shaft, in which the stator has an electromagnet, the rotor has a magnet, and a magnetic pole of the electromagnet corresponding to a position of the rotor moves along a circumferential direction of the stator.

(2)

The actuator according to (1), in which the stator has a predetermined number, which is two or more, of layers along an axial direction of the stator, the teeth are arranged on an outer peripheral surface of each of the predetermined number of layers, each of the predetermined number of layers has the electromagnet, and the rotor has the predetermined number of magnets along an axial direction of the rotor.

(3)

The actuator according to (2), in which the stator and the rotor are disposed in a positional relationship such that the electromagnet included in each of the predetermined number of layers and each of the predetermined number of magnets included in the rotor face each other.

(4)

The actuator according to (3), in which the predetermined number is three or more.

(5)

The actuator according to (4), in which a member that includes a magnetic material is disposed between individual adjacent magnets.

(6)

The actuator according to (4) or (5), in which respective shapes of the outer peripheral surfaces of the predetermined number of layers are substantially the same.

(7)

The actuator according to (6), in which the predetermined number of layers are combined so that positions of individual teeth arranged respectively on the outer peripheral surfaces of the predetermined number of layers are different from each other as viewed from the axial direction of the stator.

(8)

The actuator according to (7), in which the predetermined number of layers are combined so that the individual teeth arranged respectively on the outer peripheral surfaces of the predetermined number of layers are at substantially equal intervals in the circumferential direction of the outer peripheral surface of the stator as viewed from the axial direction of the stator.

(9)

The actuator according to (8), in which the number of teeth arranged on the outer peripheral surface of the stator is smaller by a predetermined number than the number of teeth of the second gear.

(10)

The actuator according to (9), in which sizes of individual teeth arranged on the outer peripheral surface of the stator are larger than sizes of individual teeth of the second gear.

(11)

The actuator according to (9) or (10), in which the rotor rotates around the central axis of the stator by repeating attraction of the rotor to the stator and repelling of the rotor from the stator as the magnetic pole of the electromagnet corresponding to the position of the rotor and included in each of the predetermined number of layers moves along the circumferential direction of the stator.

(12)

The actuator according to (11), in which supply of power to the electromagnet of each of the predetermined number of layers is controlled so that the magnetic pole is switched at every position of the individual teeth arranged on the outer peripheral surface of each of the predetermined number of layers corresponding to the position of the rotor.

(13)

The actuator according to any one of (9) to (12), further including the first gear, in which the second gear is disposed inside the first gear with respect to the central axis of the stator, and a rotation axis of the second gear is coaxial with the central axis of the stator.

(14)

The actuator according to (13), in which external teeth of the second gear rotate while meshing with external teeth of the first gear.

(15)

The actuator according to any one of (9) to (12), further including the first gear, in which the second gear is disposed outside the first gear with respect to the central axis of the stator, the second gear is an internal gear, and a rotation axis of the second gear is coaxial with the central axis of the stator.

(16)

The actuator according to any one of (9) to (15), in which a ring-shaped carrier is fixed between the rotor and the first gear, a rotation axis of the carrier is coaxial with the central axis of the stator, and the carrier rotates around the central axis of the stator according to rotation of the rotor.

(17)

The actuator according to any one of (9) to (16), further including a plurality of the rotors, in which each of the plurality of rotors rotates around the central axis of the stator while teeth arranged on an outer peripheral surface of the rotor mesh with the teeth arranged on the outer peripheral surface of the stator, the plurality of rotors is disposed respectively at substantially equal intervals in the circumferential direction of the outer peripheral surface of the stator, and the magnetic pole of the electromagnet corresponding to respective positions of the plurality of rotors moves along the circumferential direction of the stator.

(18)

An actuator including:

a stator that has teeth arranged on an outer peripheral surface;

a rotor that rotates around a central axis of the stator while teeth arranged on an outer peripheral surface mesh with the teeth arranged on the outer peripheral surface of the stator;

a second gear that rotates while meshing with a first gear coupled to the rotor coaxially with a central axis of the rotor and is coupled to an output shaft; and a third gear that is located on an opposite side of the stator with respect to the rotor and rotates while meshing with the teeth arranged on the outer peripheral surface of the rotor, in which one of the stator and the third gear has a magnet, the other of the stator and the third gear has an electromagnet, and a magnetic pole of the electromagnet corresponding to a position of the rotor moves along a circumferential direction of the stator or a circumferential direction of the third gear, so as to cause the third gear to rotate.

(19)

The actuator according to (18), in which rotation of the third gear causes the rotor to rotate around a central axis of the stator.

(20)

An actuator including:

a stator that has teeth arranged on an outer peripheral surface;

a rotor that rotates around a central axis of the stator while teeth arranged on an outer peripheral surface mesh with the teeth arranged on the outer peripheral surface of the stator; and a second gear that rotates while meshing with a first gear coupled to the rotor coaxially with a central axis of the rotor and is coupled to an output shaft, in which the stator has a predetermined number, which is three or more, of layers along an axial direction of the stator, the teeth are arranged on an outer peripheral surface of each of the predetermined number of layers, each of the predetermined number of layers has a magnet having a predetermined magnetization pattern in a circumferential direction of the layer, the rotor has the predetermined number of electromagnets along an axial direction of the rotor, and a magnetic pole of each of the predetermined number of electromagnets is switched according to a position of the rotor.

REFERENCE SIGNS LIST

10 Actuator
100 Stator
110 Layer
120 Rotor
122 Coupling portion
130 Planetary gear
140 Sun gear
142, 152 Bearing
150 Carrier
160 Ring gear
170 Slot
200 Housing
1100, 1210 Electromagnet
1102, 1200 Magnet
1104, 1204, 1300, 1400 Tooth
1200 Magnet
1202 Member
1206 Hole

The invention claimed is:

1. An actuator, comprising:
a stator that includes:
a plurality of layers along an axial direction of the stator;
first teeth on an outer peripheral surface of each of the plurality of layers; and
a plurality of electromagnets, wherein each of the plurality of layers includes a corresponding electromagnet of the plurality of electromagnets;
a rotor that includes:
second teeth on an outer peripheral surface of the rotor; and
a plurality of magnets along an axial direction of the rotor, wherein
the rotor is configured to move along a circumferential direction of the stator in a state in which the second teeth on the outer peripheral surface of the rotor mesh with the first teeth on the outer peripheral surface of each of the plurality of layers of the stator, a magnetic pole of each of the plurality of electromagnets is configured to move along the circumferential direction of the stator, and the magnetic pole of each of the plurality of electromagnets corresponds to a position of the rotor;

a first gear coupled to the rotor, wherein a rotation axis of the first gear is coaxial with a central axis of the rotor;

an output shaft; and a second gear configured to rotate in a state in which the second gear meshes with the first gear, wherein the second gear is coupled to the output shaft.

2. The actuator according to claim 1, wherein the stator and the rotor are in a positional relationship such that the plurality of electromagnets in the plurality of layers faces the plurality of magnets in the rotor.

3. The actuator according to claim 2, wherein the plurality of layers includes three layers.

4. The actuator according to claim 3, wherein
the rotor further includes a member that includes a magnetic material, and
the member is between individual adjacent magnets of the plurality of magnets.

5. The actuator according to claim 3, wherein a shape of the outer peripheral surface of a first layer of the plurality of layers is substantially same as a shape of the outer peripheral surface of a second layer of the plurality of layers.

6. The actuator according to claim 5, wherein first positions of the first teeth on the outer peripheral surface of the first layer of the plurality of layers are different from second positions of the first teeth on the outer peripheral surface of the second layer of the plurality of layers as viewed from the axial direction of the stator.

7. The actuator according to claim 6, wherein the first teeth on the outer peripheral surface of the first layer of the plurality of layers and the first teeth on the outer peripheral surface of the second layer of the plurality of layers are at substantially equal intervals in the circumferential direction of the stator as viewed from the axial direction of the stator.

8. The actuator according to claim 7, wherein a number of the first teeth on the outer peripheral surface of each of the plurality of layers of the stator is smaller, by a specific number, than a number of third teeth of the second gear.

9. The actuator according to claim 8, wherein sizes of the first teeth on the outer peripheral surface of each of the plurality of layers of the stator are larger than sizes of the third teeth of the second gear.

10. The actuator according to claim 8, wherein
the rotor is further configured to move along the circumferential direction of the stator by attraction of the rotor to the stator and repulsion of the rotor from the stator, and
the attraction of the rotor to the stator and the repulsion of the rotor from the stator are based on the movement of the magnetic pole of each of the plurality of electromagnets.

11. The actuator according to claim 10, further comprising a central processing unit configured to control supply of power to the corresponding electromagnet of each of the plurality of layers to switch, based on the position of the rotor, the magnetic pole of each of the plurality of electromagnets at every position of the first teeth on the outer peripheral surface of each of the plurality of layers.

12. The actuator according to claim 8, wherein
the second gear is inside the first gear with respect to a central axis of the stator, and
a rotation axis of the second gear is coaxial with the central axis of the stator.

13. The actuator according to claim 12, wherein the second gear is further configured to rotate in a state in which the third teeth of the second gear mesh with fourth teeth of the first gear.

14. The actuator according to claim 8, wherein
the second gear is outside the first gear with respect to a central axis of the stator,
the second gear is an internal gear, and
a rotation axis of the second gear is coaxial with the central axis of the stator.

15. The actuator according to claim 8, further comprising a ring-shaped carrier between the rotor and the first gear, wherein
a rotation axis of the ring-shaped carrier is coaxial with a central axis of the stator, and
the ring-shaped carrier is configured to rotate around the central axis of the stator based on the movement of the rotor.

16. The actuator according to claim 8, further comprising a plurality of rotors, wherein
the plurality of rotors includes the rotor,
each of the plurality of rotors is configured to move along the circumferential direction of the stator in a state in which the second teeth on an outer peripheral surface of each of the plurality of rotors mesh with the first teeth on the outer peripheral surface of each of the plurality of layers of the stator,
the plurality of rotors is at substantially equal intervals in the circumferential direction of the stator, and
the magnetic pole of each of the plurality of electromagnets corresponding to a respective position of a plurality of positions of the plurality of rotors is configured to move along the circumferential direction of the stator.

17. An actuator, comprising:
a stator that includes first teeth on an outer peripheral surface of the stator;
a rotor that includes second teeth on an outer peripheral surface of the rotor, wherein the rotor is configured to move along a circumferential direction of the stator in a state in which the second teeth on the outer peripheral surface of the rotor mesh with the first teeth on the outer peripheral surface of the stator;
a first gear coupled to the rotor, wherein a rotation axis of the first gear is coaxial with a central axis of the rotor;
an output shaft;
a second gear configured to rotate in a state in which the second gear meshes with the first gear, wherein the second gear is coupled to the output shaft; and
a third gear on a specific side of the stator, wherein
the rotor is between the third gear and the stator,
the third gear is configured to rotate in a state in which third teeth of the third gear mesh with the second teeth on the outer peripheral surface of the rotor,
the third gear includes a magnet,
the stator further includes an electromagnet,
a magnetic pole of the electromagnet corresponding to a position of the rotor is configured to move along the circumferential direction of the stator, and
the rotation of the third gear is based on the movement of the magnetic pole of the electromagnet.

18. The actuator according to claim 17, wherein the rotor is further configured to move along the circumferential direction of the stator based on the rotation of the third gear.

19. An actuator, comprising:
- a stator that includes first teeth on an outer peripheral surface of the stator;
- a rotor that includes teeth on an outer peripheral surface of the rotor, wherein the rotor is configured to move along a circumferential direction of the stator in a state in which the second teeth on the outer peripheral surface of the rotor mesh with the first teeth on the outer peripheral surface of the stator;
- a first gear coupled to the rotor, wherein a rotation axis of the first gear is coaxial with a central axis of the rotor;
- an output shaft; and
- a second gear configured to rotate in a state in which the second gear meshes with the first gear, wherein the second gear is coupled to the output shaft, wherein
  - the stator further includes at least three layers along an axial direction of the stator,
  - the first teeth are on an outer peripheral surface of each of the at least three layers,
  - each of the at least three layers includes a magnet having a specific magnetization pattern in the circumferential direction of the stator,
  - the rotor further includes a specific number of electromagnets along an axial direction of the rotor, and
  - a magnetic pole of each of the specific number of electromagnets is configured to be switched based on a position of the rotor.

* * * * *